United States Patent [19]
Vatt et al.

[11] Patent Number: 5,543,785
[45] Date of Patent: Aug. 6, 1996

[54] DISTRIBUTED MULTI-OUTLET PAGING

[75] Inventors: Gregory B. Vatt, Mesa, Ariz.; David M. Baum, McLean, Va.; Steven J. Goldberg, Coral Springs, Fla.

[73] Assignee: Motorola, Inc., Schaumburg, Ill.

[21] Appl. No.: 403,542

[22] Filed: Mar. 14, 1995

Related U.S. Application Data

[63] Continuation of Ser. No. 42,435, Apr. 5, 1993, abandoned.

[51] Int. Cl.⁶ .............................. H04Q 7/08; H04B 7/00; G08B 5/22
[52] U.S. Cl. ............................. 345/825.44; 455/38.100; 340/825.520; 379/211
[58] Field of Search ................... 340/825.52, 825.44, 340/825.49; 379/60, 211; 455/38.1

[56] References Cited

U.S. PATENT DOCUMENTS

| | | | |
|---|---|---|---|
| 4,082,919 | 4/1978 | Day et al. | 179/2 |
| 4,308,613 | 12/1981 | Chasek | 370/94 |
| 4,644,351 | 2/1987 | Zarbarsky et al. | 340/825.44 |
| 5,045,850 | 9/1991 | Andros et al. | 340/825.44 |
| 5,065,423 | 11/1991 | Gaskill | 340/825.44 |
| 5,122,795 | 6/1992 | Cubley et al. | 340/825.44 |
| 5,197,092 | 3/1993 | Bamburak | 379/211 |
| 5,251,248 | 10/1993 | Tokunaga | 379/211 |
| 5,270,701 | 12/1993 | Ito et al. | 379/211 |
| 5,274,845 | 12/1993 | Wang | 340/825.49 |

Primary Examiner—Alyssa H. Bowler
Assistant Examiner—Mark H. Rinehart
Attorney, Agent, or Firm—Gregory J. Gorrie

[57] ABSTRACT

A distribution network 108 receives simplex communications or pages from any number of user interface nodes (UINs) (202) and distributes the pages to one or more paging outlets provided by page termination nodes (PTNs) (110) and delivery systems (102). The UINs (202) perform the bulk of the processing related to the distributed system of the present invention. Originator services (1000) are provided through UINs (202). Through originator services (1000) callers may place pages or inquire about previously placed pages. In placing pages, page originators can specify options (1102–1104) related to the delivery of pages. Subscriber updating services (1100) are also provided through UINs (202). The updating services (1100) allow a subscriber to alter (802–812) the services provided by the distribution network (108). For example, the subscriber may change delivery addresses (402) which identify the delivery systems (102) through which pages are to be delivered. Security procedures are implemented to insure that only authorized persons can alter the specification of services provided by the distribution network (108).

23 Claims, 14 Drawing Sheets

| SUBSCRIBER ACTIVITY TABLE ||| 
|---|---|---|
| SEQUENCE NUMBER | STATUS | LINK TO PAGE |
| ... | | |
| ... | | |

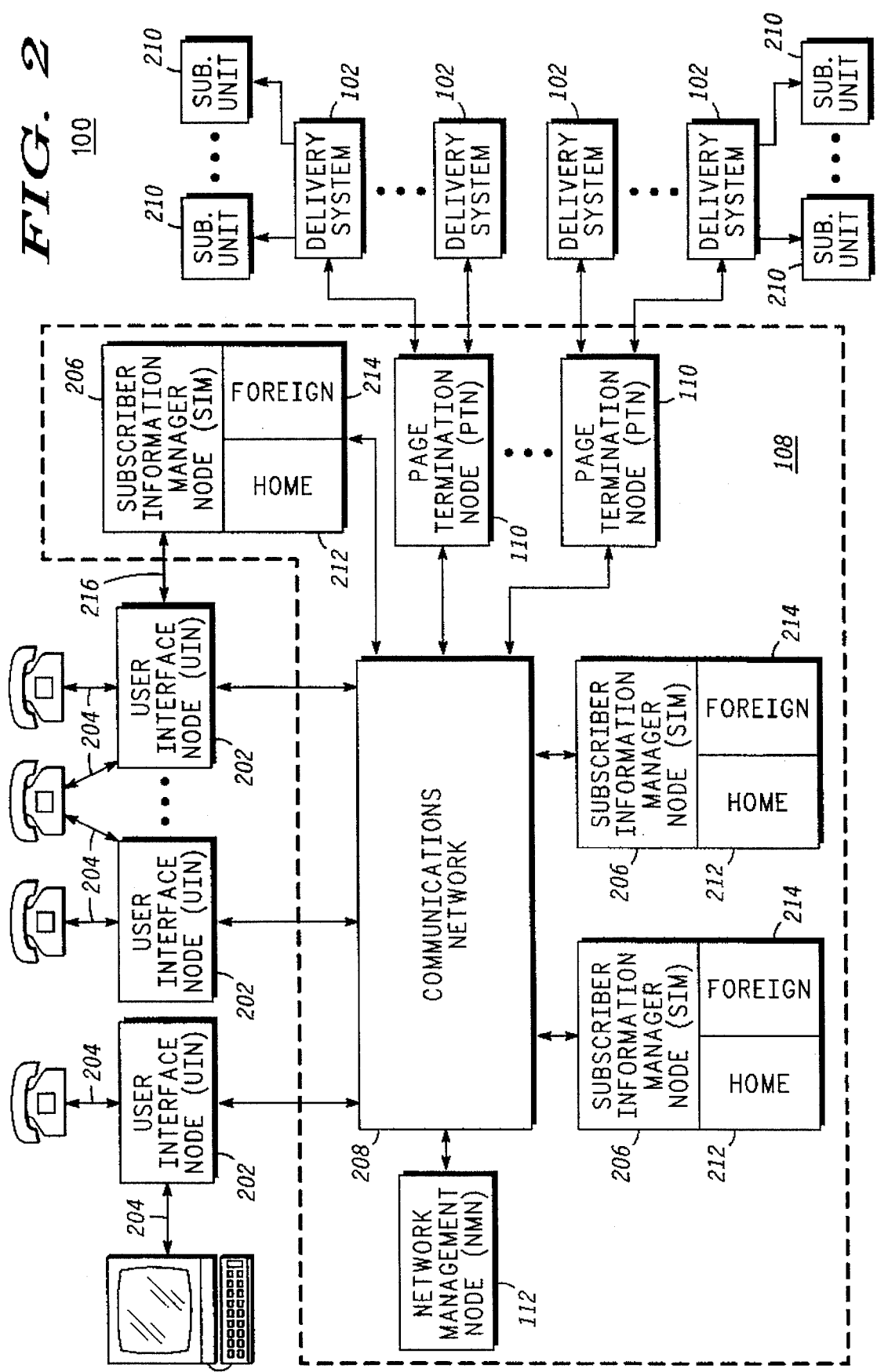

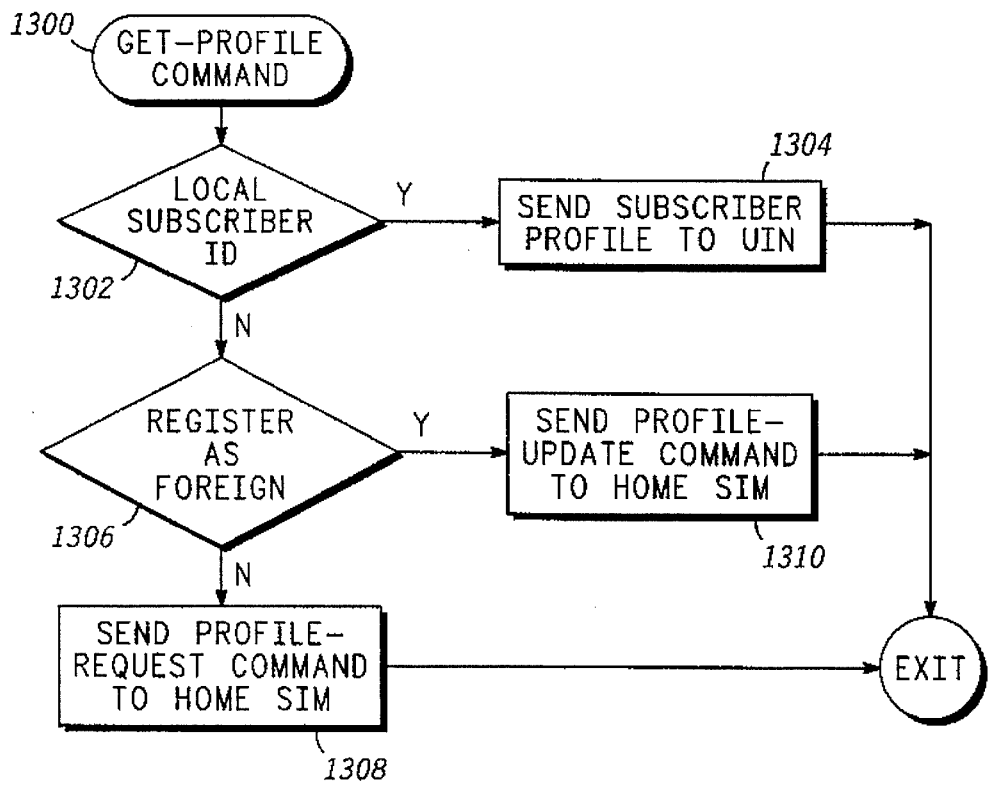
FIG. 13
FIG. 14
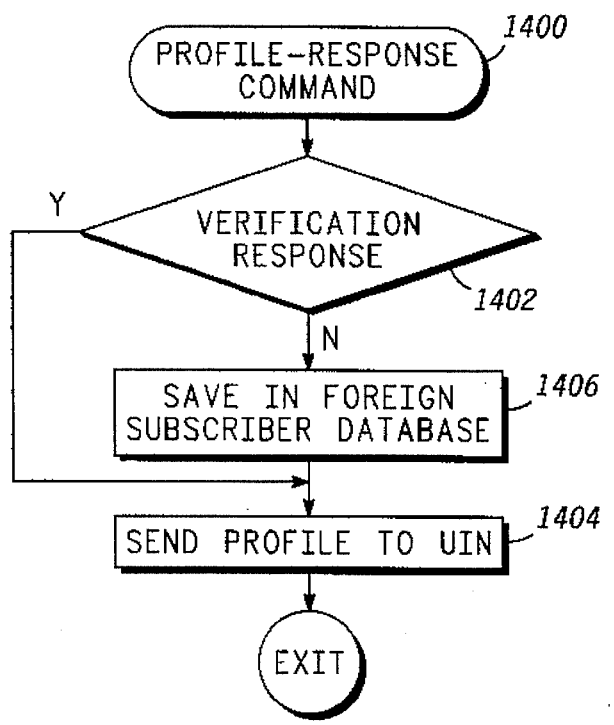

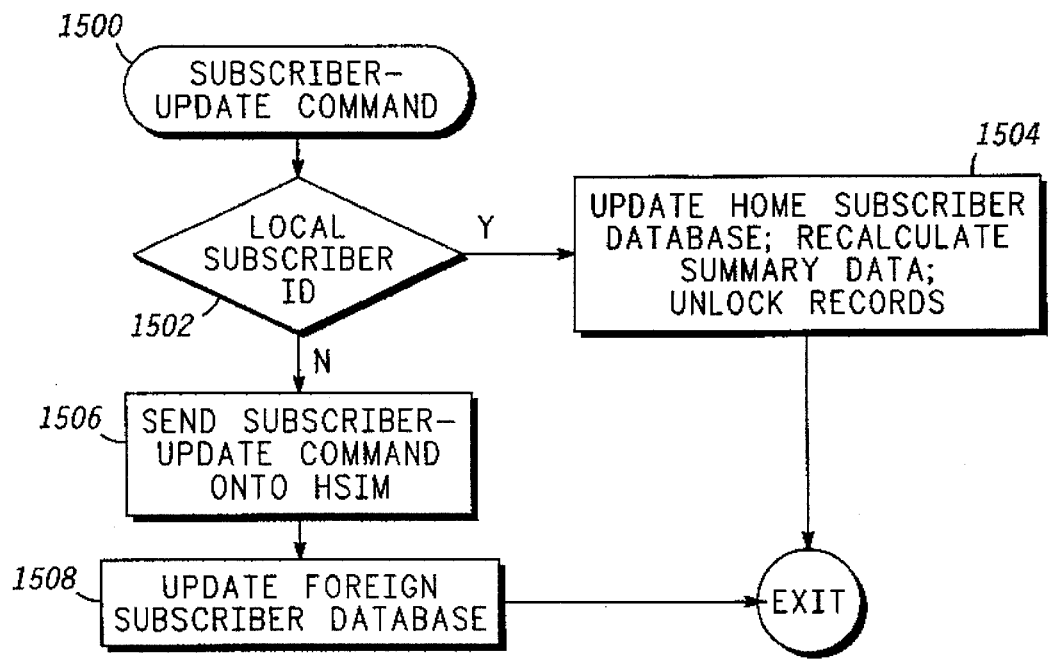
FIG. 15
FIG. 16
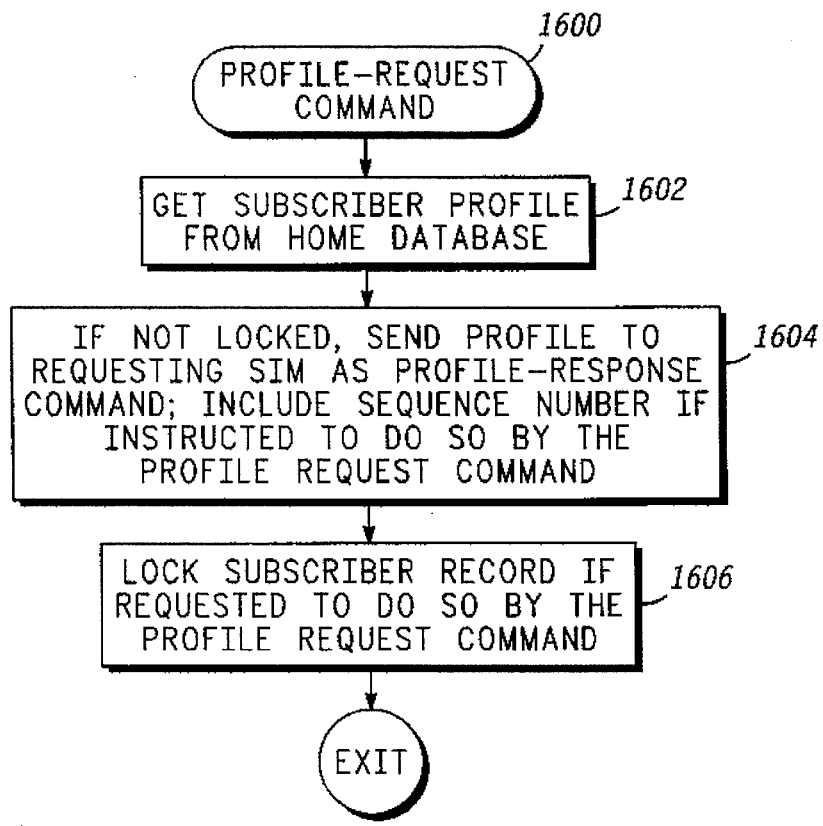

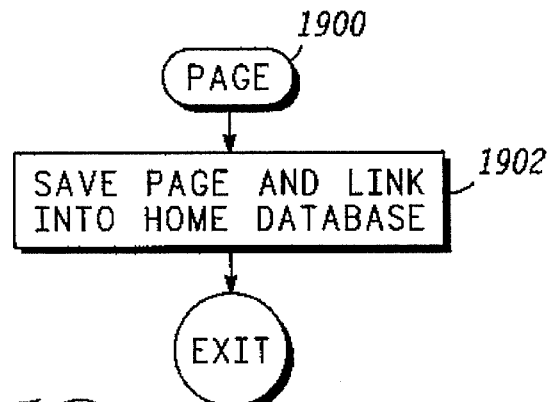
FIG. 19
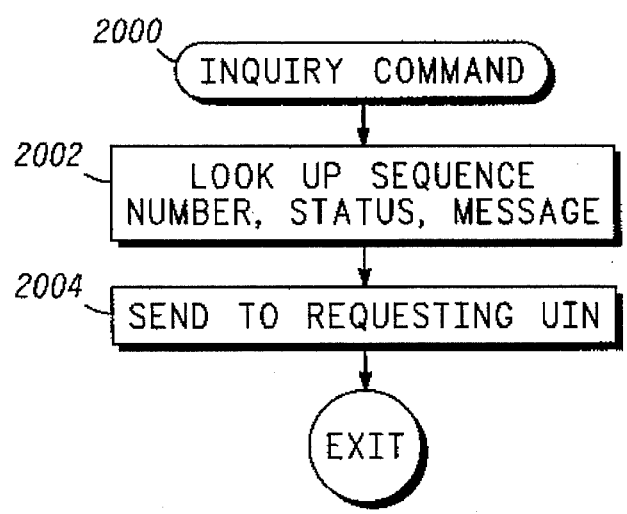
FIG. 20
FIG. 21
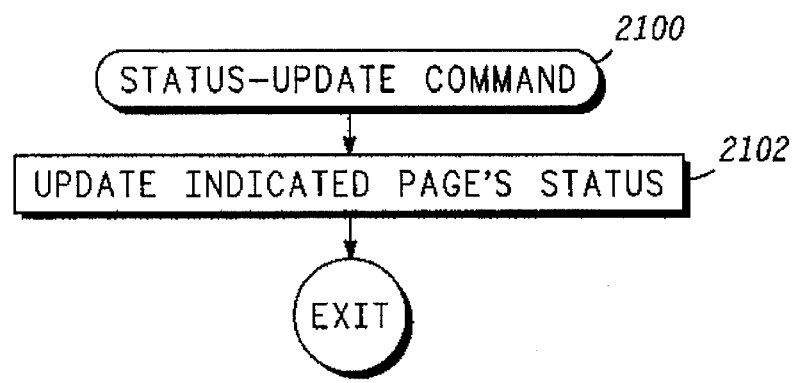

DISTRIBUTED MULTI-OUTLET PAGING

This application is a continuation of prior application Ser. No. 08/042,435 filed Apr. 5, 1993, now abandoned.

TECHNICAL FIELD OF THE INVENTION

The present invention relates generally to communication systems. More specifically, the present invention relates to paging systems which offer multiple page delivery options.

BACKGROUND OF THE INVENTION

Paging relates to simplex messaging services. In other words, simplex calls, hereinafter referred to as pages, are made to specified subscribers of the service. When a subscriber unit, such as a pager, receives a page, the subscriber is alerted. The pages may carry messages, or they may simply communicate the fact that the subscriber is being paged. Generally speaking, the service is considered a simplex service because communication travels in one direction only, from the page originator to the subscriber.

Many paging systems are in current use. Typical paging services use RF communications to deliver pages to pagers. Hence, pagers need not be anchored to a particular location and may be carried with subscribers. Since pagers only receive communication, they do not require transmitters or signal transmission capabilities. As a result, pagers are typically small, low-power, light weight, readily portable, and inexpensive units.

Conventional paging systems experience a problem related to range limitations. A paging system works only when its pagers reside within the area that can be reached by the system's transmitters. When subscribers travel outside this area, their pagers cannot receive calls. Another aspect of this problem is a limitation on paging capacity. As an area of coverage increases to better serve subscriber needs, the population of pagers likewise increases. As the population of pagers increases, the number of data communications increase. Thus, as the coverage area increases a point of diminishing returns can be reached. The number of data communications can become so great that an unacceptable delay in the delivery of calls is experienced. Moreover, conventional paging systems typically deliver pages only to those pagers that are specifically designed to be compatible with the paging system's RF communication parameters. Thus, economies of scale resulting from combining the capacities of independent paging systems are difficult to achieve.

Accordingly, a need exists for a superstructure which accepts pages from page originators and then routes the pages to appropriate independent paging sub-systems for delivery of the pages.

SUMMARY OF THE INVENTION

Accordingly, it is an advantage of the present invention that an improved system and method of delivering pages is provided.

Another advantage of the present invention is that multiple page-delivery options are provided.

Another advantage is that the present invention forms a distributed network where processing power is concentrated in a multiplicity of user interface nodes.

Yet another advantage is that the present invention provides a system which, regardless of actions that individual devices coupled to the system may take, remains operational for and through other devices.

The above and other advantages of the present invention are carried out in one form by a method of operating a user interface node in accordance with a distributed, multi-outlet paging system. The method calls for obtaining an initiation communication having an identification (ID) value. This ID value identifies a subscriber to whom a page is to be sent. A command is sent to a database node. This command instructs the database node to return current delivery address data. The particular current delivery address data returned is associated with the ID value. The current delivery address data is received, and the page is sent to one of a plurality of nodes configured for the receipt of pages. The one node to which the page is sent is identified in response to the delivery address data.

The above and other advantages of the present invention are carried in another form by a method of operating a distributed, multi-outlet paging system. The method calls for obtaining a subscriber profile request command from a user interface node. This profile request command has an identification (ID) value, and the ID value identifies a subscriber to whom a page is to be sent. This ID value is processed to determine an address of a home database node. The home database node has a current delivery address stored therein. The profile request command is routed to the home database node. This profile request command instructs the home database node to return the current delivery address data associated with the ID value. The current delivery address data is then sent from the home database node to the user interface node.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a block diagram of a paging system;

FIGS. 13–22 show flow charts of procedures performed by various nodes in a network of the paging system shown in FIG. 2.

The description presented below and the Figures are linked together through the use of reference numbers. These reference numbers are chosen to reflect the number of the FIG. in which the referenced items may be best observed. In particular, the most significant digit of all three-digit reference numbers and the most significant two digits of all four-digit reference numbers equal the number of a FIG. in which that referenced feature may be viewed.

DETAILED DESCRIPTION OF THE PREFERRED EMBODIMENTS

Figures 1, 5:
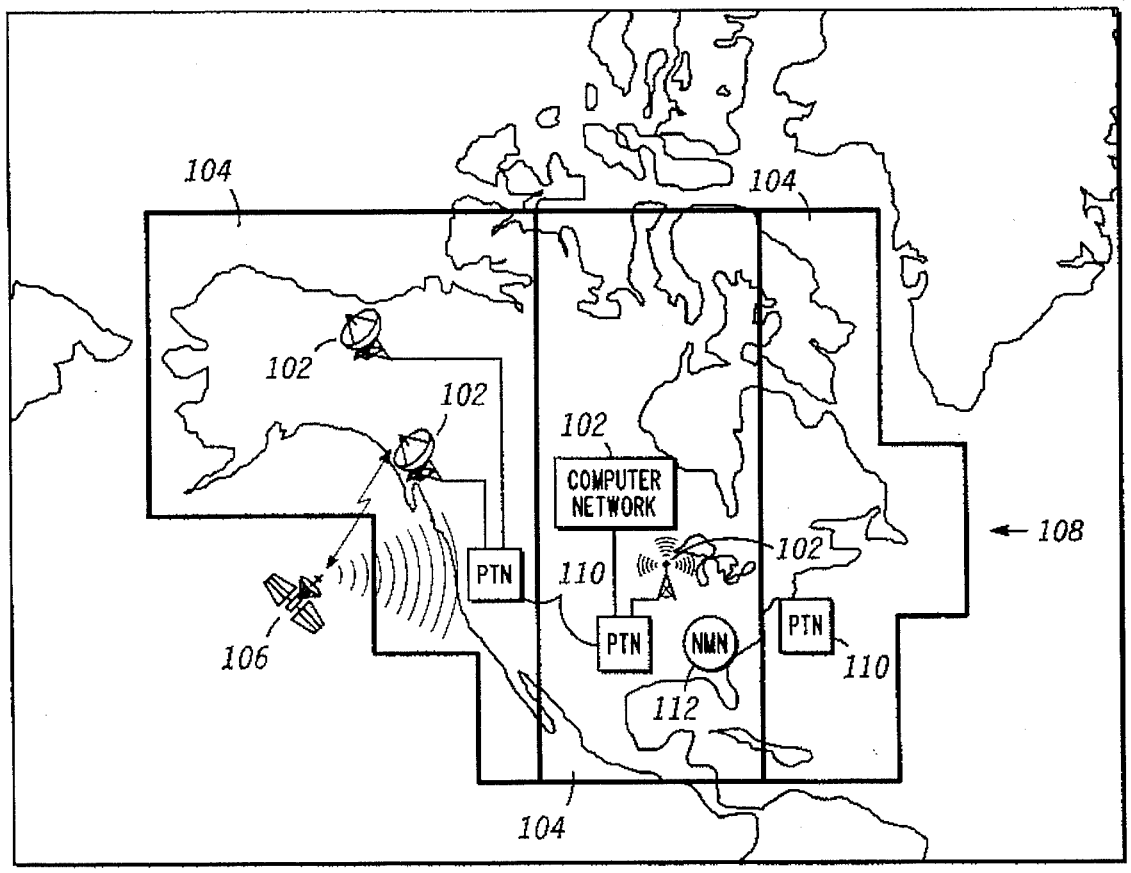
FIG. 1 shows a layout diagram of an exemplary environment in which the preferred embodiment of the present invention may be practiced.
FIGS. 3–5 show tables of data elements useful to the paging system shown in FIG. 2.

FIG. 1 shows a layout diagram of an exemplary environment 100 in which the preferred embodiment of the present invention may be practiced. Through the operation of the present invention, pages may be delivered to any of a large number of delivery systems 102 which exist within environment 100. For purposes of the present invention, the term page or pages refers to any simplex communication, whether delivered through RF channels or otherwise. Those skilled in the art will appreciate that pages are addressed to one or more intended recipients. They may, but need not, carry messages to the recipients. For the purposes of the present invention, pages include communications carried by traditional paging services as well as electronic mail, and other messages carried on computer networks and through other communication channels.

As shown in FIG. 1, environment 100 distributes jurisdictions for delivering pages over a plurality of geographic regions 104. FIG. 1 illustrates North America as being divided into three of regions 104. The precise number and arrangement of regions 104 are chosen somewhat arbitrarily and are not to be viewed as limitations on the present invention. Moreover, nothing prevents the entire globe from being divided into regions 104 or smaller geographic areas from being divided into regions 104.

Each region 104 includes any number of delivery systems 102. Delivery systems 102 collect and deliver pages within their own areas of jurisdiction. Nothing requires delivery systems 102 to be compatible or similar to one another. Thus, some delivery systems 102 may utilize traditional terrestrial RF transmission facilities which are directed to specific limited geographic areas. Other delivery systems 102 may utilize space-based RF communication facilities 106 which direct communications to wider geographic areas. Still other delivery systems 102 may utilize gateways to deliver pages over computer networks. Each of these and other delivery systems 102 are characterized by a unique delivery system identification within which there are unique delivery addresses.

In accordance with preferred embodiments of the present invention, a distribution network 108, discussed in more detail below in connection with FIG. 2, operates within environment 100 to receive and deliver pages to appropriate delivery systems 102. Delivery systems 102 then deliver the pages to subscriber units (not shown) using their particular delivery techniques. Network 108 represents a superstructure which allows delivery systems 102 to operate together, in spite of great diversity in the nature and characteristics of delivery systems 102. Network 108 preferably includes one page termination node (PTN) 110 for each region 104. It is PTNs 110 which deliver pages to the specified delivery systems 102 for subsequent delivery to subscriber units. In addition, network 108 preferably includes one network management node (NMN) 112. NMN 112 collects statistics and operational status data on the operation of network 108.

FIG. 2 shows a block diagram of environment 100 and of distribution network 108 therein. Pages are collected from persons or data communication equipment wishing to originate pages at user interface nodes (UINs) 202. Environment 100 may include any number of UINs 202, and UINs 202 may be distributed over regions 104 in any convenient manner. UINs 202 may be controlled by those who operate delivery systems 102, but this is not a necessity. UINs 202 receive page origination information through origination channels 204. Channels 204 are desirably duplex channels which may couple a UIN 202 to the public switched telecommunications network (PSTN), to a local or wide area computer network, or to any other duplex communication service. In the preferred embodiments, a substantial amount of the intelligence required for delivering pages resides in UINs 202, and procedures performed by UINs 202 are discussed below in connection with FIGS. 6–12.

UINs 202 couple to network 108. Network 108 includes PTNs 110 and NMN 112, discussed above, any number of subscriber information manager nodes (SIMs) 206, and a communications network 208. NMN 112 and each UIN 202, PTN 110, and SIM 206 couple to network 208. Thus, through communications network 208, each UIN 202 may engage in data communication with any PTN 110 or SIM 206, and each SIM 206 may engage in data communication with any other SIM 206 or PTN 110. Each PTN 110 couples to one or more delivery systems 102. Delivery systems 102 deliver pages to any number of subscriber units 210. Alternatively, delivery systems 102 need not deliver pages to subscriber units 210 but may represent a gateway to a computer network, for example, which delivers pages in accordance with electronic mail techniques.

Each UIN 202 is assigned to its own SIM 206. From the perspective of a SIM 206, a UIN 202 which is assigned thereto is a "subtending" UIN. From the perspective of a UIN 202, a SIM 206 to which the UIN is assigned is a "controlling" SIM 206. From the perspective of a subscriber, or a person to whom pages are sent, one of SIMs 206 is considered a "home" SIM 206. The home SIM 206 stores information describing that subscriber and the paging services currently offered for that subscriber. This information is stored in a home database 212 of the home SIM 206. Each SIM 206 also includes a foreign database 214. Foreign database 214 stores information about subscribers who do not consider the SIM 206 a home SIM, but on whose behalf the SIM 206 is nevertheless being used. The use of a SIM on behalf of a foreign subscriber may be to support the receipt by a subtending UIN 202 of a page being originated by another person. Alternatively, the use of a SIM on behalf of a foreign subscriber may be by a subscriber who is accessing network 108 to alter or make inquiries about his or her paging services.

In accordance with the present invention, high priority data communication may take place between a UIN 202 and its controlling SIM 206. The high priority nature of this communication results from a need for quick responses. As will be discussed in more detail below, data are transferred between controlling SIMs 206 and UINs 202 while a page is being originated and while users may be waiting for responses. Accordingly, those skilled in the art will appreciate that a dedicated line 216 or other communication link suitable for high priority communications may be desirable between a UIN 202 and a SIM 206. Line 216 is a part of communications network 208.

In one embodiment of the present invention, at least a portion of the local UINs 202 and controlling SIMs 206 are constructed as different logical entities of a common set of computer hardware. In this situation, communication link 216 is implemented within the common set of computer hardware through computer programming.

In the preferred embodiments of the present invention, each of nodes 110, 112, 202, and 206 of network 108 represents a computer. In other words, each of these nodes includes a processor and memory (not shown). The respective memories store the home and foreign databases 212–214 in SIMs 206, as well as other tables, lists, variables, and programming instructions for each of nodes 110, 112, 202, and 206. Each of these nodes may desirably include timing circuitry so that the nodes are aware of the date and time. Each preferably include input devices, such as network interfaces, modems, keyboards and the like, along with output devices, such as network interfaces, modems, video display terminals, printers, and the like. In addition UINs 202 may desirably include telecommunication interface components sufficient to operate an interactive voice response (IVR) system. Conventional versions of such components are suitable for use by the present invention, and such components of computers are well known to those skilled in the art.

Delivery systems 102 additionally represent computerized equipment. However, systems 102 may, in addition, desirably include components which permit systems 102 to conform to particular RF communication schemes. Delivery systems 102, through which pages may be sent to subscriber units 210, and subscriber units 210 suitable for receiving pages are well known to those skilled in the art.

Figures 3, 4:
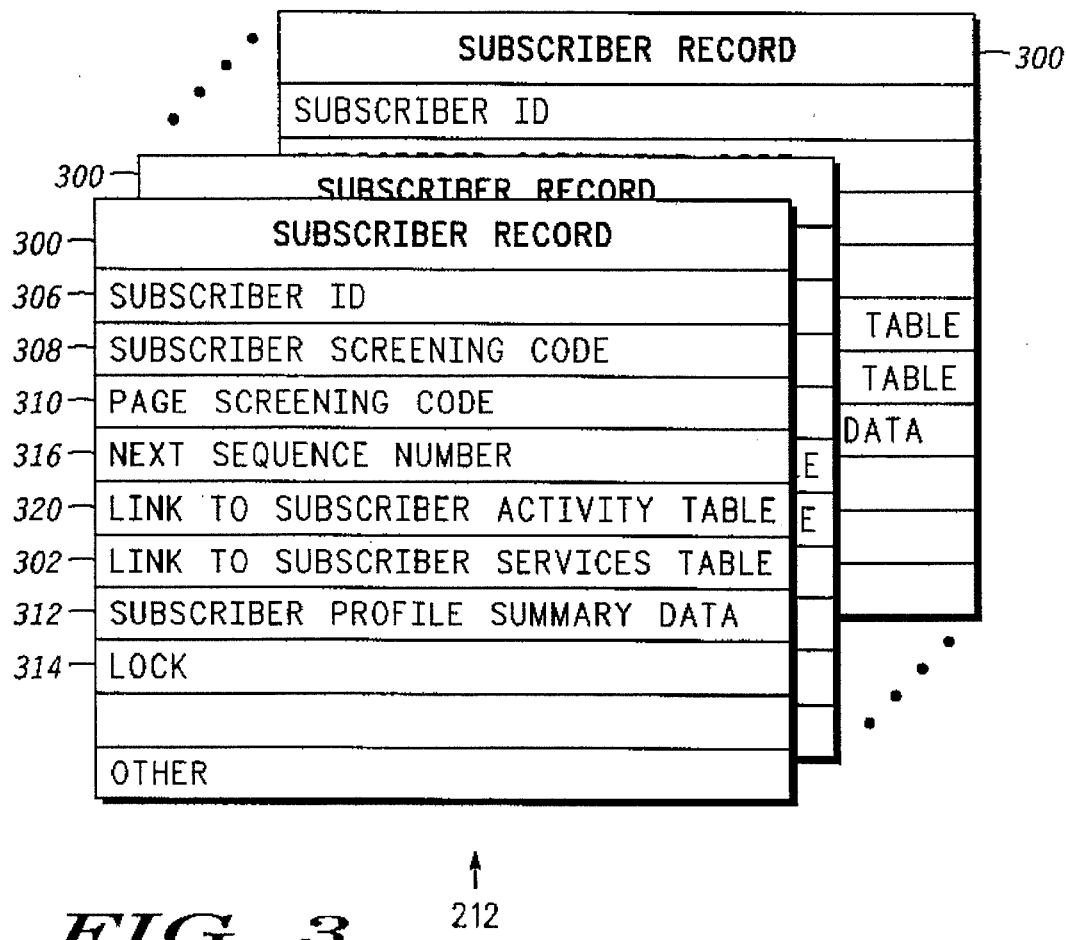

FIGS. 3–5 show data items included in home and foreign databases 212–214. The data items shown in FIGS. 3–5 relate to a subscriber (i.e. the person to whom pages are sent) and his or her equipment, such as a subscriber unit 210. In general, databases 212–214 include information for many subscribers, and each subscriber's information is included within his or her own subscriber record 300. Since home database 212 preferably includes a more extensive set of data items than foreign database 214, FIGS. 3–5 are presented from the perspective of home database 212. Those skilled in the art will appreciate that, with a few exceptions which are discussed below, much of the data shown in FIGS. 3–5 applies to a "subscriber profile" and to foreign database 214 as well.

In general, subscriber record 300 includes data items identifying the subscriber and the services or features offered by network 108 for the subscriber. Home database 212 may desirably include billing data, network usage statistical data, registration data, subscriber name, address, credit, and other identifying data, and the like, but these data items need not be reflected in foreign databases 214 or subscriber profiles and are not discussed further herein.

The service data items are shown in connection with a subscriber services table 400 (see FIG. 4). Subscriber services table 400 is linked to a subscriber record 300 via a link 302 recorded in a subscriber's record 300. The present invention permits subscribers and page originators to modify these services when needed so that the needs of subscribers and page originators are best met. For example, the services include a list of delivery systems 402. Delivery systems 402 identify the PTNs 110 and delivery systems 102 to which pages are to be directed. Multiple systems 402 may be included in table 400 so that pages may be delivered through multiple systems. Table 400 need not list all systems 102 existing within environment 100. Rather, table 400 may list only a default subset of all delivery systems 102. Then, the subscriber may dynamically activate and deactivate delivery systems 402 as the subscriber's needs require.

For example, a subscriber who is traveling may deactivate one delivery system 102 and activate another system 102 so that pages follow him or her to his or her destination. Alternatively, a subscriber may activate multiple delivery systems when his or her location is expected to vary widely. Billing may desirably be based on network usage so that the subscriber is motivated to keep no more delivery systems active than meet his or her needs. Moreover, within the parameters of the delivery systems listed in table 400, a call originator may override a subscriber's specification of a delivery system, if an appropriate override screening code is supplied, to cause a page to be delivered to an alternate delivery system 102.

Accordingly, the present invention may provide paging over an extremely large area, but no one delivery system requires the capacity to accommodate the entire large area. Rather, the area is divided among delivery systems 102, and the subscriber may "program" distribution network 108 to specify those systems 102 which best meet the subscriber's needs.

Other services provided by distribution network 108 include, but are not limited to, placing a hold on pages to be delivered to a subscriber, recalling pages delivered to a subscriber, archiving pages, and allowing a call originator to check on the status of a page after the page is placed. These services and other data items shown in FIGS. 3–5 will be discussed in detail below.

FIGS. 6–12 show flow charts of procedures performed by a UIN 202 in accordance with the teaching of the present invention. The present invention contemplates that each UIN 202 within environment 100 will perform substantially the same procedures. Thus, the procedures depicted by FIGS. 6–12 apply to any and all UINs 202. Moreover, a conventional interactive voice response (IVR) system may be utilized in controlling the procedures of FIGS. 6–12. Those skilled in the art appreciate that IVR systems are often used to collect a diversity of information from callers over phone lines.

The bulk of the intelligence related to routing pages and to supporting the subscriber and call-originator programming services of the present invention is included in UINs 202. Thus, the present invention represents a distributed system. Since the present invention is a distributed system, reliability is improved in comparison with a centralized system. Moreover, costs are equitably distributed over the entire system and not concentrated in centralized equipment. Those skilled in the art will appreciate that, in the preferred embodiments of the present invention, the procedures shown in FIGS. 6–12 are implemented by computerized equipment under the control of computer programs stored within the equipment's memories. Moreover, those skilled in the art will appreciate that these procedures are preferably reentrant. Hence, multiple ones of these procedures may be in progress at any given time with respect to one or more pages being placed.

Figure 6:
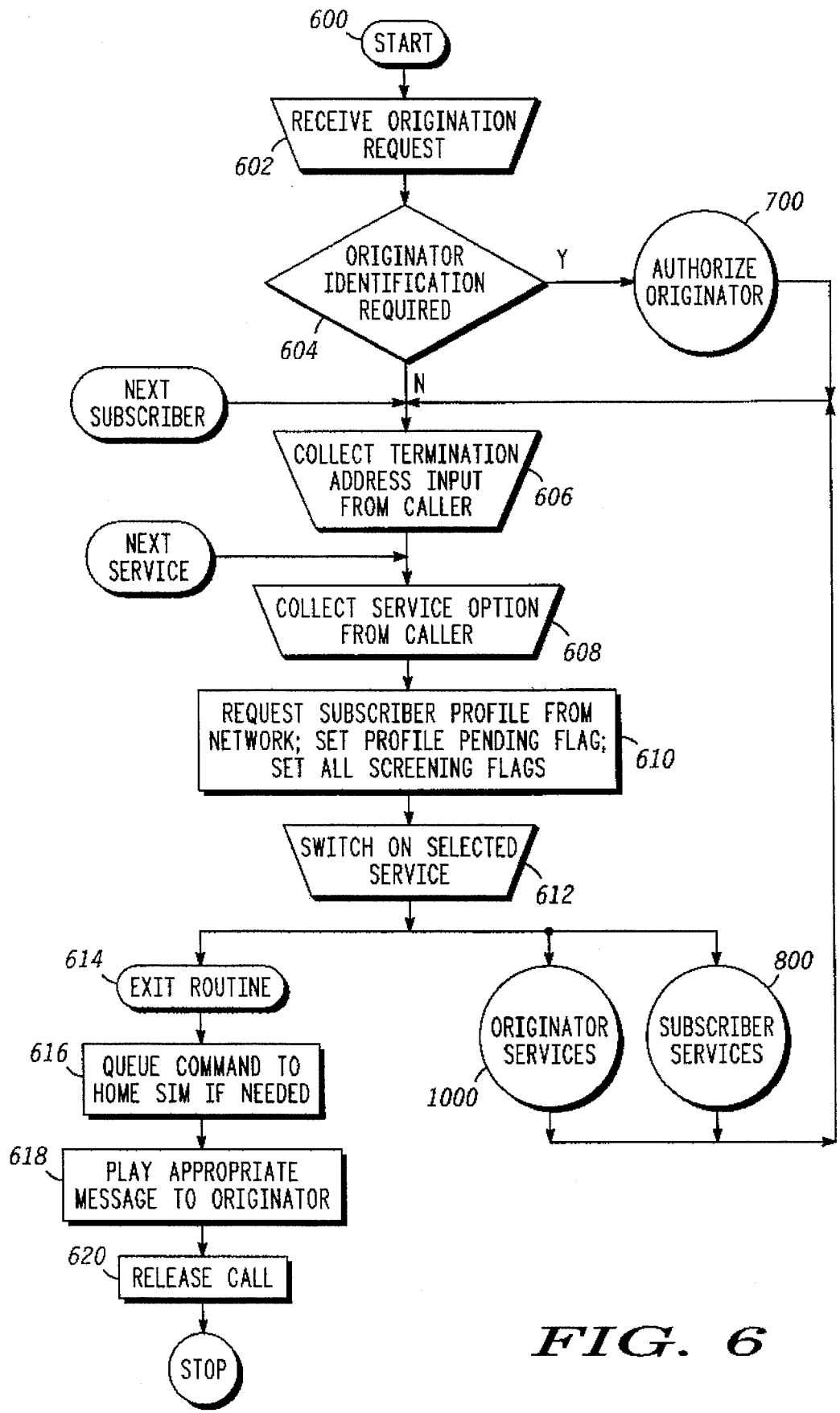
FIGS. 6–12 show flow charts of procedures performed by user interface nodes (UINs) of the paging system shown in FIG. 2.

FIG. 6 shows a flow chart of a Start procedure 600, which UIN 202 performs when an origination request is received, at a task 602. This request is received over channel 204. It may be received in the form of a phone call or a message received from a computer network. It may be received from a person using dual-tone multi-frequency (DTMF) or other conventional telephonic equipment. It may be received from a computer, perhaps controlled by a person, using conventional MODEM data communication techniques. Regardless of the source and form, the request informs UIN 202 that the services of distribution network 108 are being requested.

When task 602 encounters a request, a query task 604 determines whether the caller is required to identify himself or herself for validation before the services of UIN 202 can be employed to access distribution network 108. This determination is based upon the rules under which UIN 202 is being operated, and such rules may be established in accordance with the needs of the business controlling UIN 202. Not all UINs 202 need to make the same decision at task 604.

Figure 7:
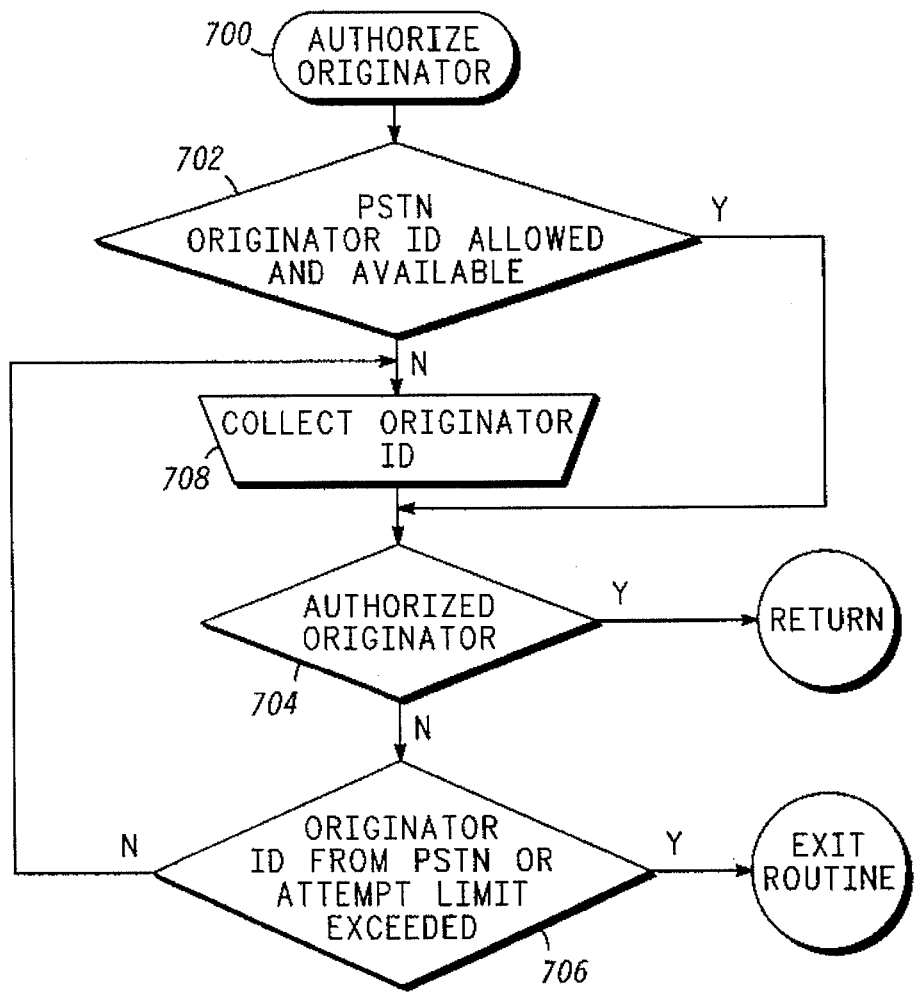

If task 604 determines that originator identification is required, then an Authorize Originator procedure 700 is performed to validate the caller. FIG. 7 shows a flow chart of procedure 700. With reference to FIG. 7, a query task 702 determines whether a PSTN type of originator ID is allowed and available. A PSTN originator ID refers to the source of the call, and the ID may be available from the PSTN as a PSTN feature.

If a PSTN originator ID is allowed and available, a query task 704 determines whether the originator ID is valid for an authorized originator. This validity is determined by consulting a list (not shown) of authorized originator IDs that is desirably stored in the memory of UIN 202. If the caller-supplied originator ID is included in this list, then the caller is considered authorized, and program control exits procedure 700 and returns to procedure 600.

On the other hand, if the caller-supplied originator ID is not valid, then a query task 706 determines whether the ID was from the PSTN or whether an attempt limit has been exceeded. If the ID was from the PSTN or an attempt limit has been exceeded, the originator is given no other opportunities to access the services offered by UIN 202, and program control exits procedure 700 and proceeds to an Exit routine 614, discussed below. The limits on attempting to access the services provided by UIN 202 improve security and minimize congestion on phone lines from illegitimate callers.

If task 706 determines that another attempt at entering a valid originator ID is allowed, program control loops to a task 708. In addition, if task 702, discussed above, determines that a PSTN-supplied originator ID is not allowed or is allowed but not currently available, program control also proceeds to task 708.

UIN 202 collects data from the caller in task 708. In particular, task 708 collects the originator ID from the call. Those skilled in the art will appreciate that the collection of data from a caller in task 708, or in any other task discussed below, may encompass several conventional processes. For example, the caller may be prompted with a message or recording that informs the caller of what information is required. UIN 202 may accept such caller-supplied data in the form of DTMF tones or ASCII data and keep such data in a buffer, even if such data are supplied before the prompt is finished. UIN 202 may desirably wait a predetermined period of time for the caller to supply a response to the prompt. When a response is received from the caller at UIN 202, UIN 202 may test the response for validity to the extent possible. If the caller fails to supply a response within the predetermined period of time or if an invalid response is detected, the prompt may be repeated to allow the caller another chance to supply valid data. If the caller again fails to supply valid data, the call may be released, preferably through Exit routine 614, discussed below. After task 708, program control proceeds to task 704, discussed above, to test the collected data for validity.

With reference back to FIG. 6, after the caller has been identified through authorization procedure 700, if required, or after task 604 when authorization is not required, a task 606 is performed. In task 606, UIN 202 collects a termination address from the caller. The termination address corresponds to, or preferably is, an identification value (ID) of a particular subscriber to distribution network 108. No one-to-one correspondence is implied between IDs and subscribers. Accordingly, some subscriber IDs may refer to all members of a particular group of subscribers, and some subscribers may be identified through the use of any of several different subscriber IDs.

After the subscriber's ID has been collected, a task 608 collects a service option from the caller. One service option at task 608 relates to pages. Through this service, pages may be originated to a subscriber. In addition, the delivery status of a previously placed, or originated, page may be checked, and pages may be recalled for presentation to a subscriber. Another service option at task 608 relates to permitting a subscriber to modify or update his or her subscriber profile. In addition, a task 608 may allow the caller to elect to exit UIN 202 at this point.

In an alternate embodiment of the present invention, UIN 202 may provide two separate access ports. These access ports may correspond, for example, to two different telephone numbers. One access port may be used exclusively for subscriber services while the other port is used exclusively for originator services. In this embodiment, task 608 need not collect service option data from the caller because the desired service option may be inferred from the identity of the access port used by the caller.

After the caller has specified which service he or she is interested in, UIN 202 performs a task 610 to request distribution network 108 to supply the identified subscriber's profile. This request is made by queuing a Get-Profile command to the controlling SIM 206. The Get-Profile command includes the subscriber's ID. In addition, the Get-Profile command specifies whether the subscribers subscriber record 400 should be locked in the subscriber's home database 212 or whether a sequence number should be returned to UIN 202 along with the subscriber's profile.

The subscriber's profile represents the subset of the data items shown in FIGS. 4–5 that is needed for accepting and routing a page, and for allowing a subscriber to alter his or her currently activated services. In particular, with reference to FIG. 3, it includes a subscriber ID data element 306, subscriber and page screening codes 308 and 310, respectively, and subscriber profile summary data 312. With respect to subscriber services table 400, which is linked to subscriber record 300 through link 302, it includes a definition of subscriber services, along with an indication of whether the services are active or not and override screening codes associated with the services. The subscriber record 300 is locked when the caller specified an update subscriber profile service above in task 608, and a sequence number is returned with the subscriber profile when the subscriber specified a page-related service above in task 608. Record 300 is locked by appropriate manipulation of lock data element 314 at the subscriber's home database 212. The sequence number is obtained from data element 316 from record 300. Once the command is queued, it is transmitted to the appropriate SIM 206 in a Background procedure 1200, discussed below. Of course, if the caller requested an exit from UIN 202 above in task 608, task 610 may be omitted.

With reference back to FIG. 6, task 610 additionally sets a profile pending flag and sets all screening flags to indicate a successfully-screened status. The screening flags are discussed below. The setting of these flags to a successfully-screened status does not suggest that successful screening will automatically result. Rather, it establishes an initialized condition from which procedures that are discussed below operate.

The profile pending flag indicates that the subscriber profile data has been ordered at UIN 202, but has not yet arrived at UIN 202. As discussed in more detail below, the profile data may be kept at the controlling SIM 206 in either home database 212 or foreign database 214. A subscriber's profile will be obtainable from a controlling SIM 206 in the majority of situations. Consequently, the subscriber profile is supplied to UIN 202 quickly over communication link 216. On the other hand, the controlling SIM 206 will occasionally need to "order" the subscriber profile from the subscriber's home SIM 206.

The delay in receiving the subscriber profile at UIN 202 varies depending on where the subscriber profile is currently located and on the data traffic load in communications network 208. UIN 202 continues to process as much of the call as possible while distribution network 108 is attempting to supply the subscriber profile to UIN 202. This provides a convenience to the caller because it minimizes the time that the caller is required to wait. In addition, it minimizes the average time that each call to UIN 202 consumes and permits a greater throughput of calls for a given level of call-receiving capacity.

Figure 8:
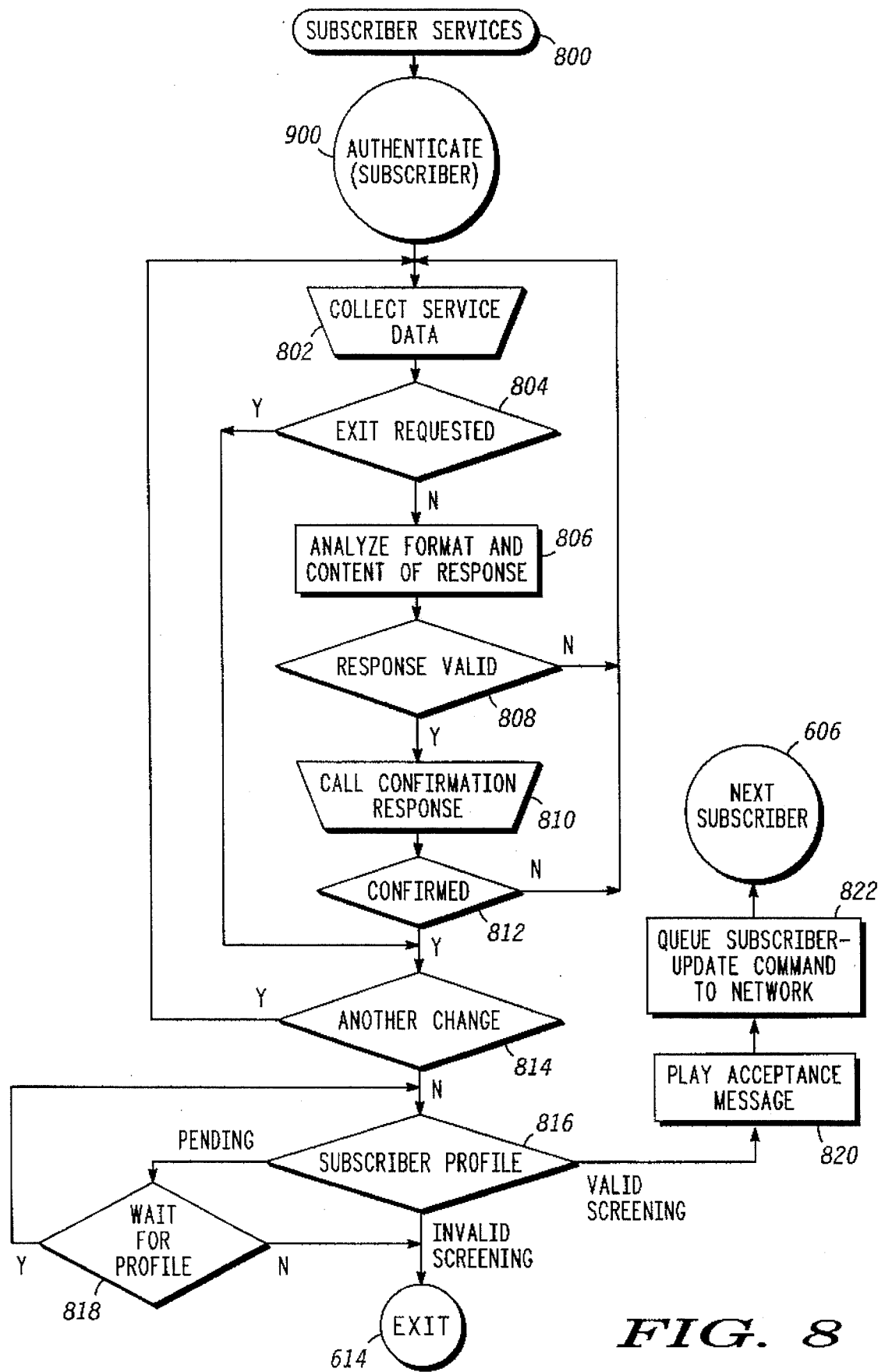
Figure 10:
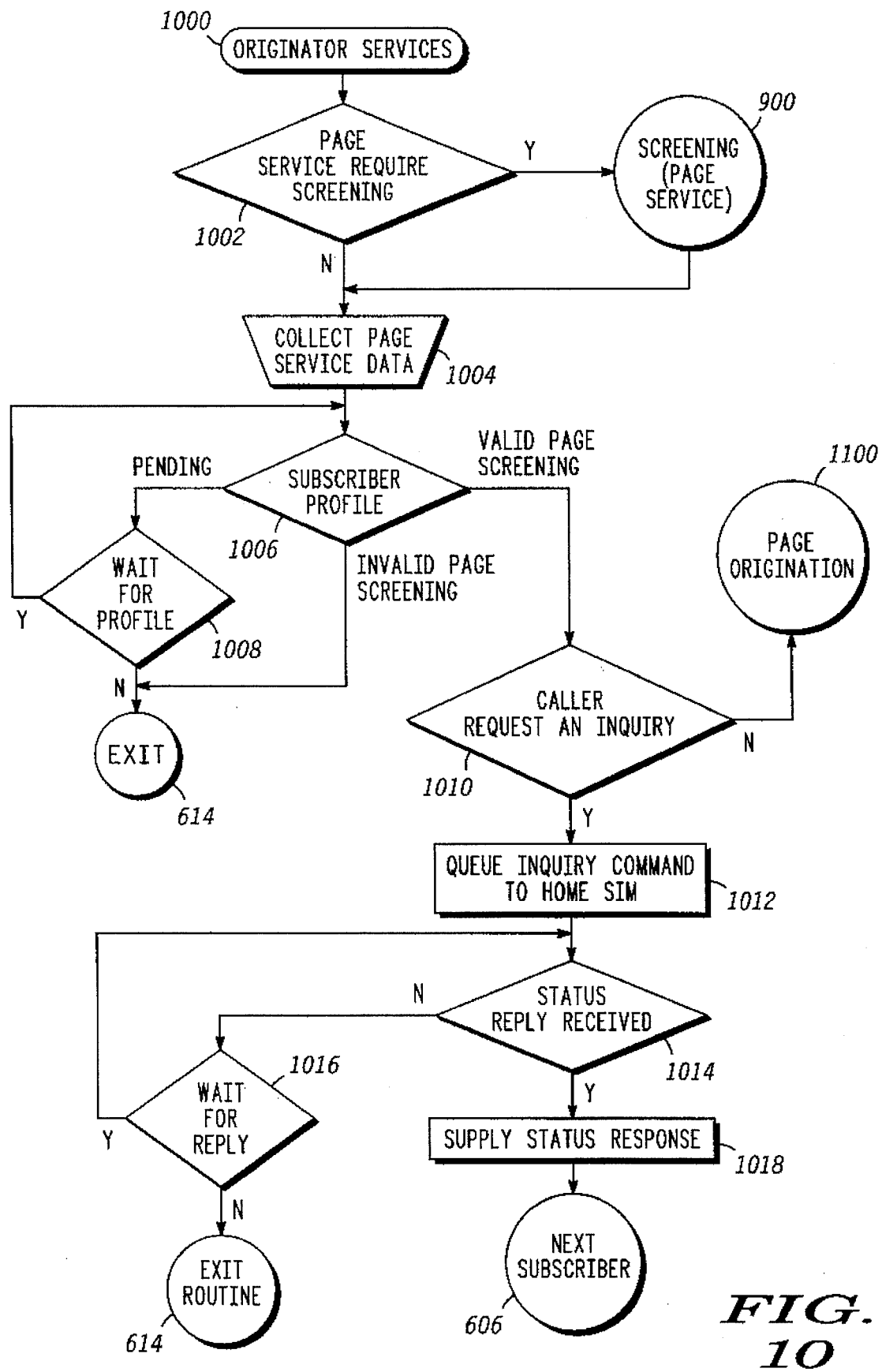

After task 610 orders a subscriber profile, a switching task 612 switches program control to a procedure or routine for processing the requested option. When the caller elects to update a subscriber profile, a Subscriber Services procedure 800, discussed below in connection with FIG. 8, is performed. When the caller elects to receive a page service, a Originator Services procedure 1000, discussed below in connection with FIG. 10, is performed. When the caller elects to exit UIN 202, an Exit routine 614 is performed.

Exit routine 614 may be entered from switching task 612 or from numerous other tasks, some of which have been discussed above. Within routine 614, a task 616 queues a Session-Done command to the home SIM 206 of the last subscriber identified above in task 606. The home SIM 206 determination may advantageously be made by evaluating the subscriber ID. Preferably, subscriber IDs are assigned so that a particular field of the subscriber ID (4–10 bits, for example) identifies the home SIM for that subscriber ID. However, task 616 is omitted unless it is needed. Task 616 is needed when a subscriber profile has been locked. As is discussed below in more detail, the sending of a Session-Done command to the home SIM 206 permits the home SIM 206 to unlock its subscriber record 300.

After task 616, a task 618 plays or otherwise sends an appropriate message into channel 204. This message informs the caller of the reason why his or her session is being terminated. The appropriate message is selected in response to the task being performed before program control was routed to Exit routine 614. After task 618, a task 620 releases the call, and procedure 600 stops. The line or channel 204 may now be used by another caller.

FIG. 8 shows a flow chart of Subscriber Services procedure 800. Procedure 800 is performed to allow a subscriber to investigate and alter the services which are currently activated for him or her, including the specification of delivery systems. In the preferred embodiment, these services may have a direct bearing on the subscriber's billings. Accordingly, security precautions are employed to insure that only the subscriber can make such alterations.

Upon entering procedure 800, program control proceeds to a screening procedure 900 to screen the subscriber. Generally speaking, the caller is forced to enter subscriber screening code 308 before procedure 800 may proceed.

Figure 9:
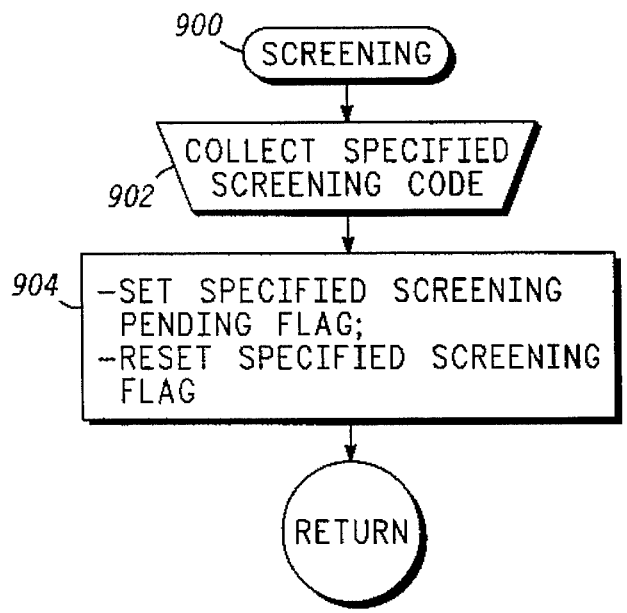

FIG. 9 shows a flow chart of Screening procedure 900. Procedure 900 collects a screening code from a caller. Procedure 900 is used to collect the subscriber screening code 308, discussed above, as well as page screening code 310 and override screening codes (see FIG. 4), discussed below. A task 902 collects the specified screening code from the caller. When procedure 900 is called from procedure 800, the specified code is subscriber screening code 308. After task 902, a task 904 sets a specified pending flag to indicate a pending state and resets the specified screening flag to indicate unsuccessful screening.

As discussed above, the subscriber profile may or may not be received at the time that procedure 900 is performed. Accordingly, no determination as to the validity or authorization of the specified caller-supplied screening code is made in procedure 900. Rather, Background procedure 1200, discussed below, resolves the screening issue in due course.

With reference back to FIG. 8, after procedure 900 a task 802 collects service data from the caller. Task 802 prompts the caller for services about which requests are being made. The caller identifies these services to UIN 202 as well as what values or states are to be applied to the services. As non-limiting examples, a caller may request that pages to him or her be placed on hold, or a caller may request the activation or deactivation of delivery systems used in delivering pages.

After service data have been collected in task 802, a query task 804 determines whether the caller has requested to exit procedure 800. When the caller does not request an exit from procedure 800, a task 806 analyzes the format and content of the caller response collected in task 802. If the caller response does not appear to be valid, a query task 808 routes program control back to task 802 so that the caller may again attempt to provide valid data. Of course, those skilled in the art will appreciate that additional tasks may be incorporated to determine whether an attempt count has been exceeded or a time limit has been exceeded before routing program control back to task 802 and to route program control to Exit Routine 614, for example, if such counts or limits have been exceeded. If task 808 determines that the caller has supplied data that appears to be valid, a task 810 collects a confirmation from the caller. Preferably, task 810 prompts the caller with an echo of the service request response made through task 802 so that the caller may cancel the request if it is not what he or she wants. If the service request is not confirmed, a query task 812 routes program control back to task 802 so that the caller may supply alternate service data. Of course, those skilled in the art will appreciate that additional tasks may be incorporated to determine whether an attempt count has been exceeded or a time limit has been exceeded before routing program control back to task 802 and to route program control to Exit Routine 614, for example, if such counts or limits have been exceeded.

When the caller confirms the service data at tasks 810–812, or when the caller requests an exit at task 804, program control proceeds to a task 814 where the caller is questioned about wishing to make another change to the subscriber record. If the caller indicates a wish to make additional changes, program control loops back to task 802. If the caller indicates that no more changes are desired, then program control proceeds to query task 816.

At this point, UIN 202 has completed as much processing as is possible without referring to the subscriber profile requested above in task 610. Accordingly, task 816 evaluates the profile pending flag for this subscriber ID to determine whether the subscriber profile has been received yet. If the profile has not been received, a query task 818 examines a timer to determine whether to wait longer for the receipt of the subscriber profile or to abort attempts at providing services for the currently identified subscriber. So long as a predetermined duration has not yet elapsed since queuing the Get-Profile command, program control loops back to task 816. While looping through tasks 816–818, UIN 200 may desirably play a recording or message to the caller which advises the caller to hold for the receipt of the subscriber's profile. When this predetermined duration has elapsed, program control proceeds back to Exit Routine 614.

When the subscriber profile has been received, Background procedure 1200, discussed below, will appropriately adjust the profile pending flag and will also set or reset the subscriber screening flag to indicate whether or not the screening code the caller supplied above in task 902 is valid. In the preferred embodiment, the code is considered valid when it matches subscriber screening code 308 of the subscriber profile. When task 816 determines that the profile has been received and the caller-supplied screening code is invalid, program control proceeds back to Exit Routine 614. No changes to the previously identified subscriber's profile will be allowed.

On the other hand, when task 816 determines that the subscriber's profile has been received and that the caller supplied a valid screening code, a task 820 plays an appropriate acceptance message to the caller, and a task 822 queues a Subscriber-Update command to distribution network 108. In particular, the Subscriber-Update command is sent from UIN 202 to its controlling SIM 206. From the controlling SIM 206 it may be passed along to a home SIM 206. The Subscriber-Update command identifies the subscriber to whom the command applies, and communicates the data item or items being updated and the new values or states to be associated with these items. After task 822, program control exits procedure 800 and returns to task 606 so that other services may be performed by UIN 202 with respect to other subscribers.

FIG. 10 shows a flow chart of Originator Services procedure 1000. Procedure 1000 is entered from task 612, discussed above, when a caller specifies the performance of a page related service. Procedure 1000 is performed after a caller has identified a subscriber for whom the page-related service is desired. At a query task 1002, procedure 1000 determines whether a page screening code is required before UIN 202 can proceed with providing a page service. This determination may be made in accordance with the operational rules of the particular UIN 202 performing task 1002. All UINs 202 within environment 100 need not resolve the decision of task 1002 the same way. When screening is required, Screening procedure 900, discussed above, is performed. In this situation, procedure 900 collects a page screening code from the caller and sets flags so that no page services will be provided until Background procedure 1200 can determine that the caller-supplied page screening code matches page screening code 310 from the subscriber's profile.

After procedure 900 or when page screening is not required by UIN 202, a task 1004 collects page service data from the caller. In particular, task 1004 prompts the caller with the various types of page-related services provided by UIN 202. Such services include the placing of pages to the identified subscriber, inquiring about the status of a previously placed page, and recalling pages placed to the identified subscriber. The caller then responds by identifying one of such services. In addition, task 1004 appropriately prompts and collects data related to the specific service requested. For example, when the placement of a page is requested, task 1004 may collect a message, such as a call-back phone number or a collection of alpha-numeric characters, for inclusion with the page. When a status or recall inquiry is requested, a sequence number which identifies a particular page previously placed to the identified subscriber is collected in task 1004.

After task 1004, UIN 202 has completed as much processing as is possible without referring to the subscriber profile requested above in task 610. Accordingly, task 1006 evaluates the profile pending flag for this subscriber ID to determine whether the subscriber profile has been received yet. If the profile has not been received, a query task 1008 determines whether to wait longer for the receipt of the subscriber profile or to abort attempts at providing services for the currently identified subscriber. So long as a predetermined duration has not yet elapsed since queuing the Get-Profile command, program control loops back to task 1006. While looping through tasks 1006–1008, UIN 202 may play a recording or message to the caller which advises the caller to hold for the receipt of the subscriber's profile. If this predetermined duration elapses before the subscriber's profile is received, program control proceeds to Exit Routine 614.

When the subscriber profile is received, Background procedure 1200, discussed below, appropriately adjusts the profile pending flag and sets or resets the page screening flag to indicate whether or not the screening code the caller may have supplied above in task 902 is valid. When task 1006 determines that the profile has been received and the caller-supplied page screening code is invalid, program control proceeds to Exit Routine 614. No page-related services for the identified subscriber will be allowed.

On the other hand, when task 1006 determines that the subscriber's profile has arrived and that a caller-supplied page screening code, if any, matches page screening code 310 of the subscriber's profile, a query task 1010 determines if the caller has requested a page inquiry. Moreover, if such services have been requested, task 1010 examines the subscriber's profile to verify that the requested inquiry features have been activated for the subscriber. If such services have been requested but are not activated, then program control may desirably be routed (not shown) back to task 1004 to allow the caller to request a different service.

If page inquiry services have been requested and are activated, a task 1012 queues an appropriate Inquiry command to the subscriber's home SIM 206. After task 1012, a query task 1014 determines whether a reply to the Inquiry command has been received. When task 1014 determines that no reply to the inquiry command has been received yet, a query task 1016 determines whether to wait longer for the receipt of the reply from the subscriber's home SIM 206 or to abort the attempt at complying with the caller's request. So long as a predetermined duration has not yet elapsed since queuing the inquiry command, program control loops back to task 1014. While looping through tasks 1014–1016, UIN 202 may play a recording or message to the caller which advises the caller to hold for receipt of the inquiry results. If this predetermined duration elapses before the Inquiry command response is received, program control proceeds to Exit Routine 614.

When task 1014 determines that the Inquiry command reply has arrived at UIN 202, a task 1018 supplies the response to the caller. For a status inquiry, a prerecorded message may inform the caller of the current status of the identified page. For a page inquiry, the identified page's message, date, and time may be given to the caller. After task 1018, program control exits procedure 1000 and returns to task 606 to allow the caller to request services with respect to another subscriber.

Figure 11:
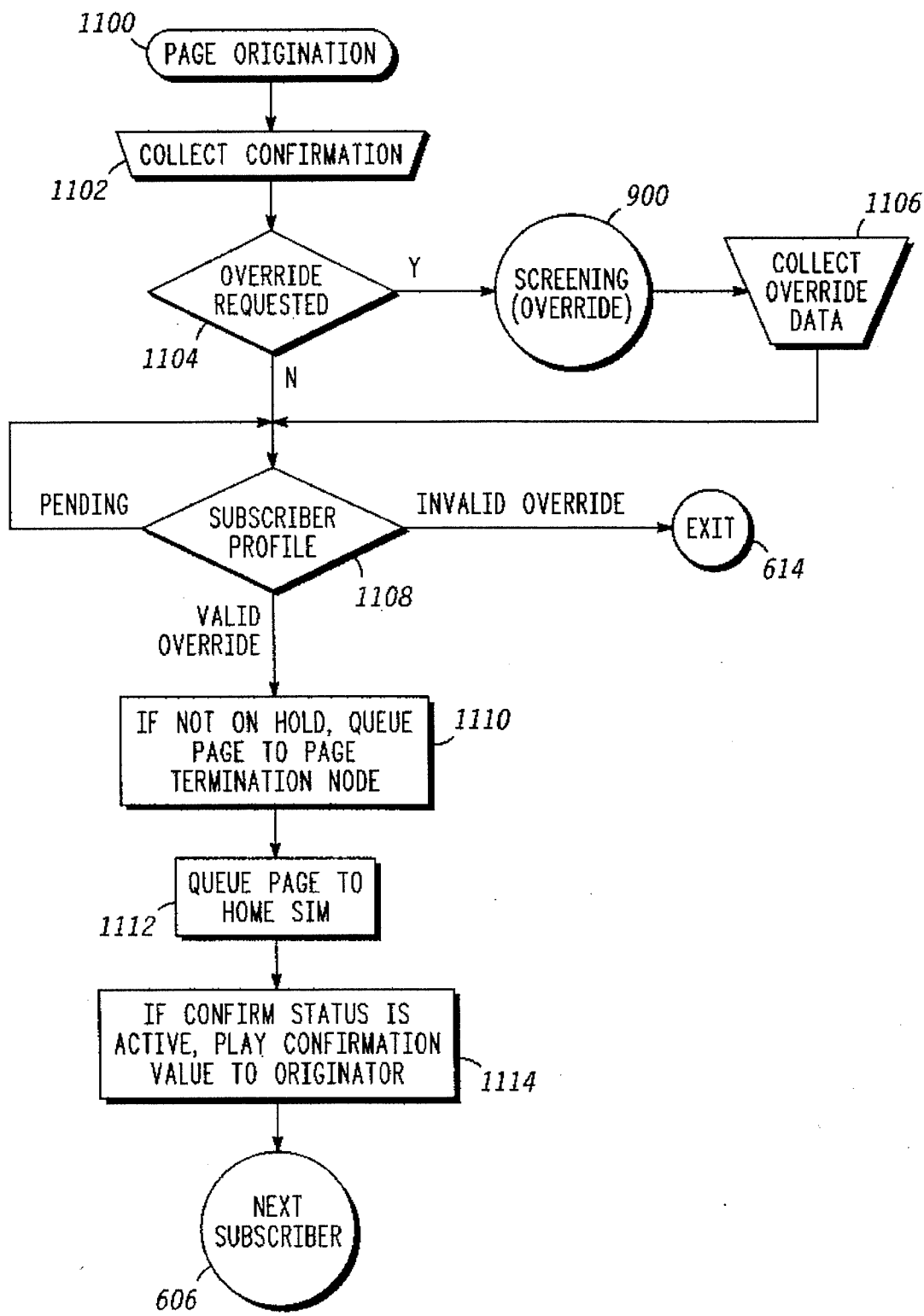

With reference back to task 1010 of procedure 1000, when a determination is made that the caller has requested the placement of a page, program control proceeds to a Page Origination procedure 1100. FIG. 11 shows a flow chart of procedure 1100. Upon entering procedure 1100, a task 1102 collects a confirmation of the page whose delivery has been requested by the caller. Task 1102 may desirably echo any message to be carried by the page. Task 1102 may additionally inform the caller of the currently active delivery systems and other service options which affect delivery of the page. For example, the caller may be informed where the page is to be delivered or whether the page will be placed on hold for later delivery to the subscriber. The caller may confirm the page and delivery parameters, abort the page (not shown), or request to override some specified delivery parameter, such as a delivery system.

After the confirmation data has been collected in task 1102, a query task 1104 determines whether the caller has requested an override to a delivery parameter. The overriding of delivery parameters may affect subscriber billings and the likelihood of successfully delivering pages. Accordingly, the caller is required to comply with security precautions before such overrides are accepted by UIN 202 and distribution network 108. When an override is requested, procedure 1100 performs screening procedure 900 with respect to the specific service (see FIG. 5) which the caller has requested. Procedure 900 will force the caller to supply an override code which should match the corresponding override code listed in the subscriber's profile before the override will be permitted.

Those skilled in the art will appreciate that it is the subscriber who selects subscriber, page, and override screening codes. Accordingly, the general public has no knowledge of such codes and cannot cause mischief with respect to the subscriber's operation of distribution network 108. On the other hand, if the subscriber wishes particular parties, such as secretaries, spouses, and the like, to be able to exert influence over the subscriber's selected operation of network 108, the subscriber can set up screening codes which permit such parties to exert such influence. Of course, nothing prevents a subscriber from setting all screening codes to the same or different values.

After procedure 900, a task 1106 collects any data which are relevant to the requested override. For example, if the caller requests page delivery to a different address than indicated in the subscriber's profile, then task 1106 collects this different address. After task 1106 or when no override is requested, program control proceeds to a query task 1108. At task 1108 the subscriber's profile has been obtained because progress beyond task 1006 (see FIG. 10) was prevented until the subscriber's profile was received. Nevertheless, at task 1108 program control pauses until any override screening has been resolved. Since the override screening validity is resolved in a background mode of operation, it may not get resolved by the time that task 1108 is performed. Accordingly, if the resolution of the override screening is pending, program control loops back to task 1108. When the override screening has been resolved and is considered invalid, program control exits procedure 900 and proceeds to Exit Routine 614.

When override screening has been resolved and is considered valid, procedure 1100 performs a task 1110. Task 1110 queues the page for transmission to one or more PTNs 110 when Page Hold is not active. The page includes a page sequence number obtained from the subscriber's profile, the address of the PTN 110 and of any delivery service 102 through which the page is to be routed, the subscriber's ID, and any message carried by the page. The determination of whether Page Hold service is active is made by examining the subscriber's profile. The determination of the PTN(s) to which the pages are to be sent is also made by examining the subscriber's profile. In particular, the activated delivery systems of the subscriber's profile are to be used in delivering the page. Task 1110 may consult a table within the memory of UIN 202 to translate these addresses to addresses of PTNs 110 that are used for routing pages thereto.

After task 1110, a task 1112 queues the page for delivery to the subscriber's home SIM 206. The home SIM 206 is identified by evaluating the subscriber's ID. When the page is routed to the subscriber's home SIM 206, it includes the sequence value obtained from the subscriber's profile, the address of the home SIM 206, the subscriber's ID, and any message carried by the page. The page additionally informs the home SIM 206 of the fact that the page has been accepted by network 108 and also informs the home SIM 206 of the identification of the PTN(s) and associated delivery system(s) identification and delivery address(es) to which the page has been sent.

After task 1112, a task 1114 determines whether the status confirmation service is activated by examining the subscriber's profile. If this service has been activated, then the sequence value is presented to the caller. Through the operation of tasks 1010–1018, the caller can call any UIN 202 within environment 100 at a later time to inquire about the status of this page. The caller will need to supply this sequence value so that the distribution network 108 can identify the page for which status is being inquired. After task 1114, program control exits procedure 1100 and returns to task 606 to allow the caller to request additional services relative to another subscriber.

Figure 12:
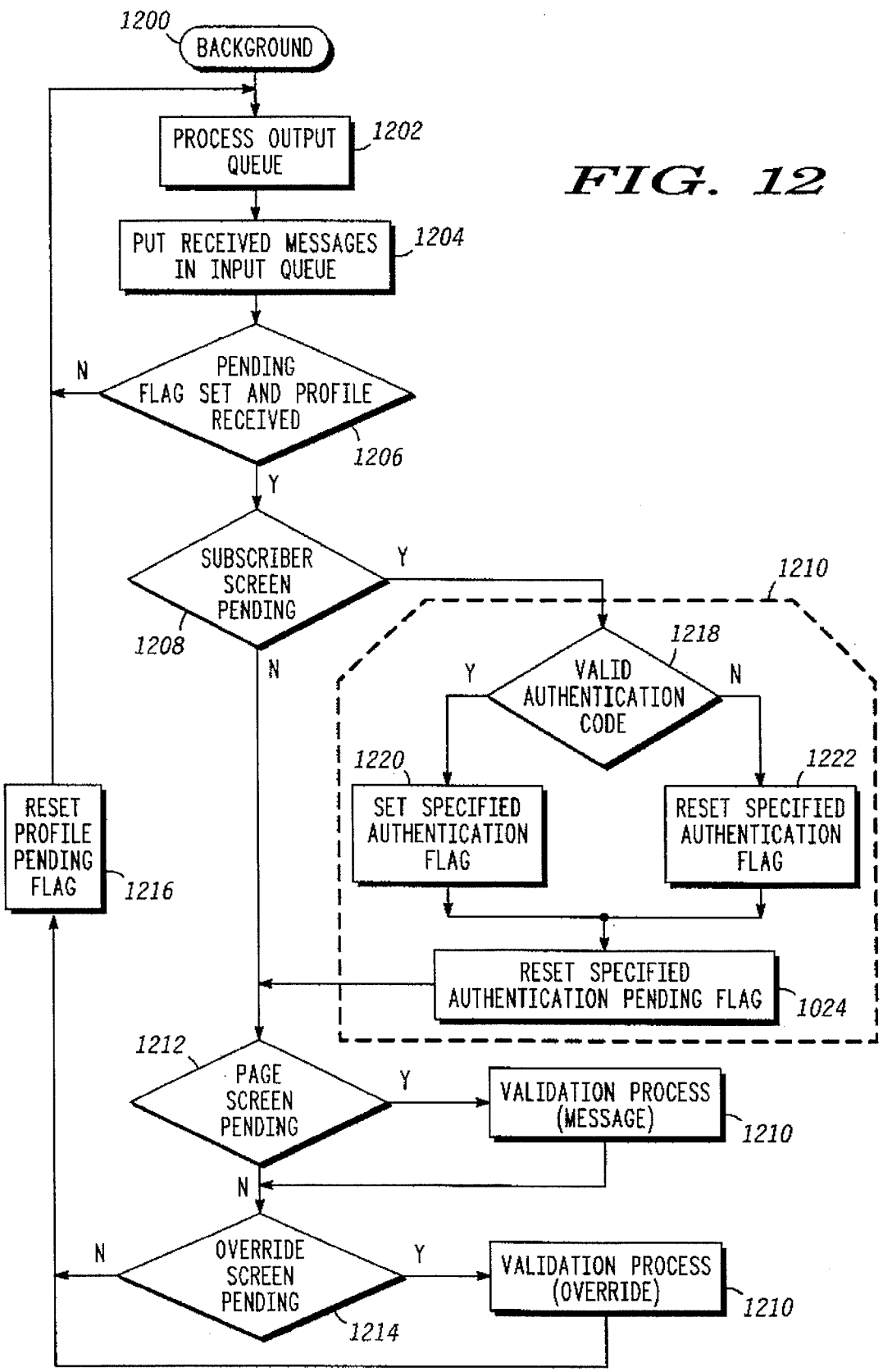

FIG. 12 shows a flow chart of Background procedure 1200. UIN 202 performs procedure 1200 in a background mode. In other words, procedure 1200 continuously operates even though other tasks not related to procedure 1200 are being performed in generally the same time frame. Procedure 1200 performs a task 1202 to process the output queue and a task 1204 to process an input queue. In other words, commands queued for transmission to other nodes on communications network 208 are sent in due course through the operation of task 1202, and data communications received from other nodes on communications network 208 are obtained through the operation of task 1204.

Those skilled in the art will appreciate that the sending of any command by any entity within environment 100, whether UIN 202 or otherwise, may include waiting for the receipt of an appropriate acknowledgment message. If an acknowledgement is not received within a predetermined period of time, then the message may be repeated. Likewise, the receipt of any message may include the transmission of an appropriate acknowledgement message in response to the received message. Such details are appreciated by those skilled in the art, are included within the scope of tasks 1202–1204, and are not discussed further herein.

After tasks 1202–1204, a query task 1206 determines whether any profile or pending flags are set with respect to any profile previously received in task 1204. If no such flags are set, then program control loops back to task 1202 to continue to process the input and output queues. If a pending flag is set, which is the normal situation immediately after a subscriber profile is received, program control proceeds to a query task 1208.

Task 1208 determines whether the subscriber screen pending flag is set. This flag is set whenever a caller has supplied a subscriber screening code. If it is set, then program control proceeds to a validation procedure 1210. If it is not set, then a query task 1212 determines whether the page pending flag is set. This flag is set whenever a caller has supplied a page screening code. If it is set, then program control proceeds to validation process 1210. If it is not set, then a query task 1214 determines whether the override pending flag is set. This flag is set whenever a caller has supplied an override screening code. If it is set, then program control proceeds to validation procedure 1210. If it is not set, a task 1216 resets the profile pending flag for the subject subscriber profile, and program control loops back to task 1202.

Validation procedure 1210 determines whether the indicated screening code supplied by the caller is valid. In particular, a query task 1218 compares the caller-supplied screening code with the corresponding screening codes included in the subscriber's profile (see FIGS. 3–5). If the caller-supplied and subscriber profile codes match or otherwise correspond to one another, then the caller-supplied code is considered valid, and a task 1220 sets the specified screening flag to indicate a valid screening code. If the caller-supplied and subscriber profile codes do not correspond, then the caller-supplied code is considered invalid. A task 1222 resets the specified screening flag, if necessary, to indicate an invalid screening code. After tasks 1220 or 1222, a task 1024 resets the specified screening pending flag to indicate that the specified screening function has now been resolved. The pending and screening flags are monitored as discussed above in connection with tasks 816, 1006, and 1108. After task 1024, program control proceeds to tasks 1212, 1214, or 1216, as indicated in FIG. 12.

FIGS. 13–22 show flow charts of procedures performed by nodes of distribution network 108. As discussed above, the bulk of the intelligence related to routing pages and supporting the subscriber and call-originator programming services of the present invention is included in UINs 202. Thus, the procedures performed by the nodes of distribution network 108 generally support the above-discussed procedures performed by UINs 202. Those skilled in the art will appreciate that, in the preferred embodiments of the present invention, the procedures shown in FIGS. 13–22 are implemented by computerized equipment under the control of computer programs stored within the equipment's memory. Moreover, those skilled in the art will appreciate that these procedures are preferably reentrant.

FIG. 13 shows a Get-Profile command procedure 1300 performed by a SIM 206 while acting as the controlling SIM to a UIN 202. In particular, procedure 1300 is performed when a Get-Profile command is received at a SIM 206 from a UIN 202. This command is sent from a UIN 202 in task 610, discussed above. The command includes a subscriber ID, and the command specifies whether the subscriber's record 300 should be locked at the subscriber's home database 212 or whether a sequence number should be returned to the UIN 202 sending the Get-Profile command, as discussed above in connection with task 610.

Procedure 1300 performs a query task 1302 to determine whether the subscriber ID communicated by the Get-Profile command represents a local subscriber ID. In other words, task 1302 determines whether the subscriber whose profile is being requested considers SIM 206 to be his or her home SIM. This determination may be made by evaluating the subscriber ID which indicates the subscriber's home SIM 206. If task 1302 determines that the SIM 206 performing procedure 1300 is the home SIM 206, then a task 1304 looks up the identified subscriber's subscriber record 300 in its home database 212 and sends this subscriber profile back to the local UIN 202 according to the Get Profile Command parameters. Task 1304 also locks the subscriber profile or includes a sequence number with the subscriber profile sent back to the local UIN 202. After task 1304, program control exits procedure 1300.

If task 1302 determines that the subscriber whose profile is being requested is not a local subscriber, then a query task 1306 determines whether that subscriber is currently registered as a foreign subscriber to the SIM 206 performing procedure 1300. The subscriber is considered a foreign subscriber if it has a foreign subscriber record for the identified subscriber in its foreign database 214. If he or she is not registered as a foreign subscriber, then a task 1308 formats and sends a Profile-Request command to the subscriber's home SIM 206. If he or she is registered as a foreign subscriber, a task 1310 formats and sends a Profile-Update command to the subscriber's home SIM 206. After tasks 1308 or 1310, the command will be sent to the subscriber's home SIM 206, and program control exits procedure 1300.

The Profile-Request command identifies the controlling SIM 206 requesting the profile and the subscriber ID for whom the request is being made. The Profile-Update command identifies the controlling SIM 206 requesting the profile update, the subscriber ID for whom the request is being made, and a summarizing data element. Both the Profile-Request and Profile-Update commands specify whether to lock the subscriber's record 300 in the home SIM 206 or to return a sequence number. The Profile-Request command asks the home SIM 206 to supply an entire subscriber profile, which is a subset of an entire subscriber record 300. Sequence number 316 will be included in the subscriber profile if the Profile-Request command specifies that it be included. This subscriber profile may require the transmission of a relatively substantial amount of data. On the other hand, the Profile-Update command asks the home SIM 206 to verify whether the subscriber profile currently saved in the controlling SIM's foreign database 214 is still valid.

To determine whether the profile is valid, some sort of summarizing data is sent to the home SIM 206. The summarizing data may be a checksum computed over the subscriber profile, excluding any sequence numbers 316. Alternatively, it may be another type of error detection code, such as a cyclic redundancy check code. In another embodiment, the summarizing data form a date or date and time stamp which indicates the last time the subscriber's profile was updated. If the home SIM 206 determines, by evaluating the summary data, that the subscriber's profile saved in the subscriber's home SIM 206 has not changed compared to the subscriber profile saved in the foreign database 214 of the controlling SIM 206, then communications network 208 need not transmit the subscriber profile back to the controlling SIM 206, and network resources are conserved.

FIG. 14 shows a flow chart of a Profile-Response command procedure 1400. Procedure 1400 is performed by a controlling SIM 206 when it receives a response from a home SIM 206 to the commands sent above in connection with task 1308 or 1310. A task 1402 determines whether the response message received at the controlling SIM 206 represents a verification response or a subscriber profile. A verification response is a brief communication which informs controlling SIM 206 that a specified subscriber record in its foreign database 214 contains a current subscriber profile. The verification response preferably includes a subscriber ID to identify the subscriber about whom the request has been made and the above-discussed sequence number 316. The sequence number may be saved in the subscriber's profile in foreign database 214. If the verification response is detected, a task 1404 is performed to send the subscriber profile from the foreign database 214, to the local UIN 202. If the verification response is not detected at task 1402, a task 1406 is performed to save a subscriber profile in the SIM's foreign database 214. After task 1406, task 1404 is performed to send the subscriber profile to the local UIN 202. After task 1404, program control exits procedure 1400.

FIG. 15 shows a flow chart of a Subscriber-Update command procedure 1500. Procedure 1500 is performed by a controlling SIM 206 when it receives a Subscriber-Update command from a UIN 202. The Subscriber-Update command identifies the subscriber to whom the command applies, and communicates a data item or items being updated and new values or states to be associated with these items. The Subscriber-Update command is transmitted by a UIN 202 during task 822.

Procedure 1500 performs a query task 1502 to determine whether the identified subscriber is a local subscriber. If the subscriber is local, a task 1504 updates the appropriate data items within home database 212 and recalculates summary data element 312 to reflect the updated subscriber profile. In addition, task 1504 unlocks the subscriber's record 300 by altering data item 314 therein. After task 1504, program control exits procedure 1500. When task 1502 determines that the subscriber is not a local subscriber, it sends the Subscriber-Update command on to the subscriber's home SIM 206 in a task 1506. In addition, it updates appropriate data items, including the summary data element 312, in its foreign database 214 in a task 1508. When the home SIM 206 receives the command it will perform its own version of procedure 1500. After tasks 1506–1508, program control exits procedure 1500.

FIG. 16 shows a flow chart of a Profile-Request command procedure 1600. Procedure 1600 is performed by a home SIM 206 when it receives a Profile-Request command from any controlling SIM 206 within environment 100. The Profile-Request command identifies the subscriber to whom the command applies, specifies whether to lock the subscriber's profile or to return a sequence number, and identifies the controlling SIM to whom a response to the command is to be sent. The Profile-Request command is transmitted by a controlling SIM 206 during task 1308, discussed above.

Procedure 1600 performs a task 1602 to get the subscriber's profile from home database 212. As discussed above, the subscriber profile is preferably a subset of all data items stored in a subscriber record 300. After task 1602, a task 1604 checks data item 314 to determine if the subscriber record is locked. If record 300 is currently locked, task 1604 waits until the record 300 becomes unlocked (not shown).

Pages are tagged with sequence numbers 316, as discussed above, so that they may be individually identified after they have been accepted by distribution network 108. Sequence numbers 316 are controlled at the home SIMs to insure that duplicate sequence numbers are avoided. If the Profile-Request command instructs home SIM 206 to include a sequence number 316, task 1604 includes sequence number 316 with the subscriber profile. Then, task 1604 sends the profile to the requesting SIM 206 in the form of a Profile-Response command, discussed above in connection with FIG. 14. Task 1604 may also increment or otherwise alter sequence number data item 316 so that a new sequence number will be immediately available. From the controlling SIM 206 receiving the profile, the profile is routed to a UIN 202, as discussed above in connection with procedure 1400.

After task 1604, a task 1606 is performed to determine whether the Profile-Request command instructed home SIM 206 to lock the subscriber's record 300. If so requested, task 1606 sets data element 314 of subscriber record 300 to indicate that the subscriber record 300 is now locked. In addition, a timer may be set so that the subscriber record 300 automatically becomes unlocked upon the expiration of a predetermined duration. This will prevent a failure on the part of a UIN 202 from harming other UINs' ability to use distribution network 108. So long as record 300 remains locked, pages may not be placed. As discussed above, record 300 is locked while subscriber profile updates are being made. This prevents pages from being placed in accordance with an out-of-date subscriber record. After task 1606, program control exits procedure 1600.

Figure 17:
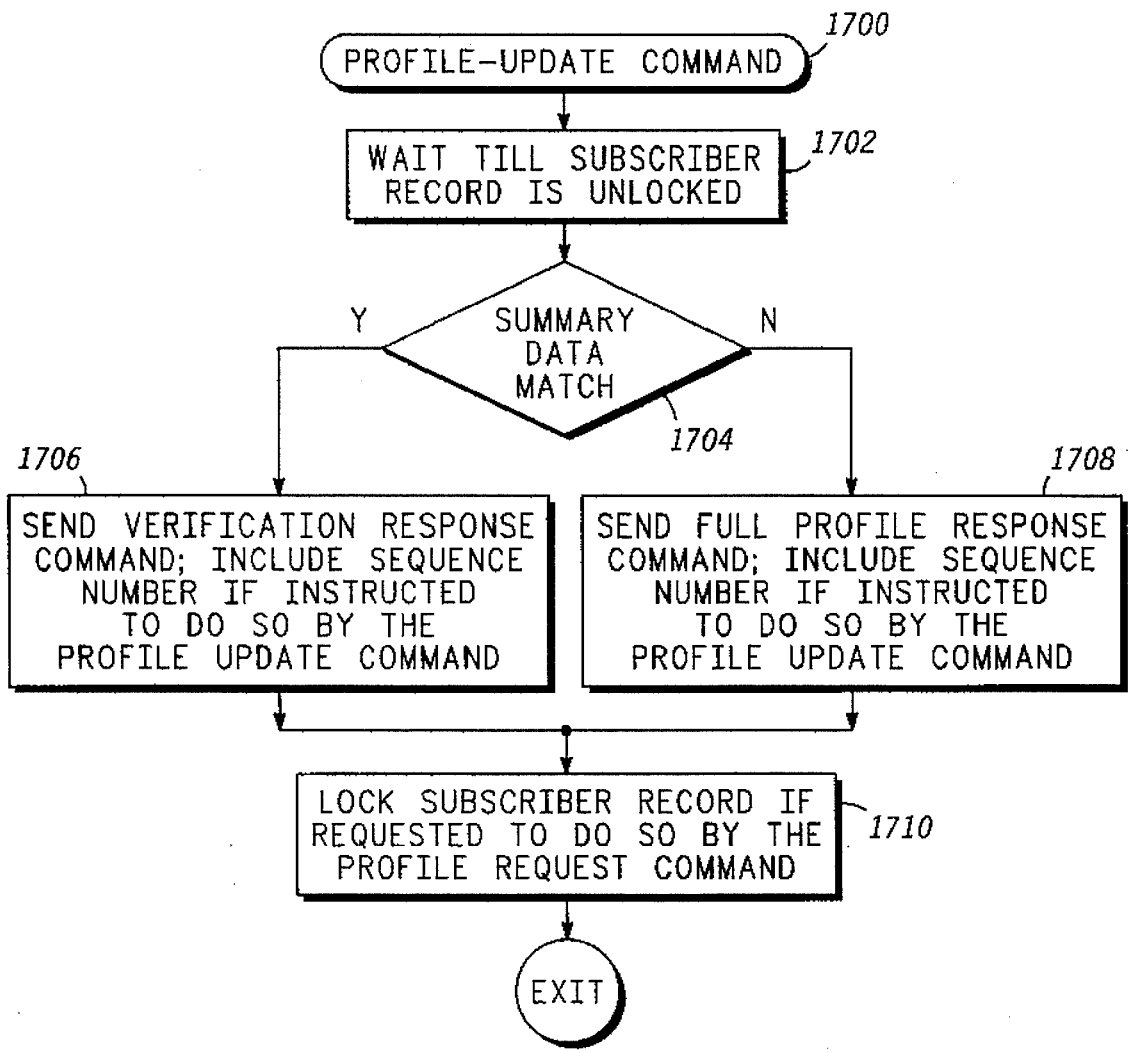

FIG. 17 shows a flow chart of a Profile-Update command procedure 1700. Procedure 1700 is performed by a home SIM 206 when it receives a Profile-Update command from any controlling SIM 206 within environment 100. The Profile-Update command identifies the subscriber to whom the command applies, identifies the controlling SIM 206 to whom a response to the command is to be sent, instructs the home SIM 206 to either lock the subscriber's record 300 or to include sequence number 316 with the returned response, and includes summarizing data. The Profile-Update command is transmitted by a controlling SIM 206 during task 1310, discussed above.

Procedure 1700 performs a task 1702 to wait until the identified subscriber's record 300 is unlocked. Task 1702 may determine whether record 300 is locked by evaluating data item 314 in the subscribers record 300. Most frequently, subscriber records 300 are unlocked at task 1702, and no significant waiting occurs. However, when a subscriber update is underway at the same time the Profile-Update command is received, program control will not progress beyond task 1702 until the record becomes unlocked. The record may become unlocked as discussed above in connection with task 1504.

After task 1702, a query task 1704 determines whether the summary data received with the Profile-Update command corresponds or otherwise matches summary data 312 included in subscriber record 300 of home database 212 for the identified subscriber. If the summary data correspond a task 1706 formats and sends a verification Profile-Response command back to the requesting SIM 206. The verification Profile-Response command includes the subscriber's ID. It also includes the sequence number from data item 316 if instructed to do so by the Profile-Update command. The receiving SIM 206 processes the verification Profile-Response command in procedure 1400, discussed above.

When task 1704 determines that the summary data do not correspond, a task 1708 formats and sends the entire subscriber profile, which is a subset of record 300, to the requesting SIM 206 in a Profile-Response command. The Profile-Response command also includes the sequence number from data item 316 if instructed to include it by the Profile-Update command. After task 1706 or 1708, a task 1710 is performed to determine whether the Profile-Request command instructed home SIM 206 to lock the subscriber's record 300. If so requested, task 1710 sets data element 314 of subscriber record 300 to indicate that the subscriber record 300 is now locked. After task 1710, program control exits procedure 1700.

Figure 18:
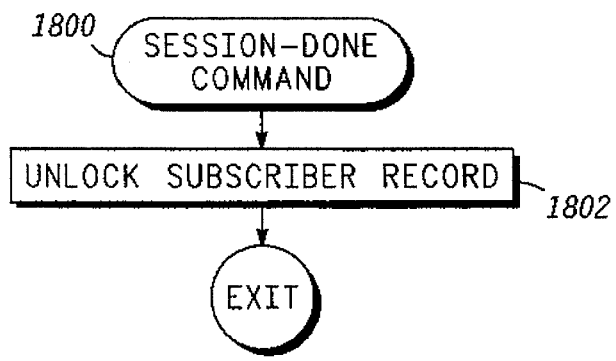

FIG. 18 shows a flow chart of a Session-Done command procedure 1800. Procedure 1800 is performed by a home SIM 206 when it receives a Session-Done command from any UIN 202 within environment 100. This command identifies the subscriber to whom the command applies and signifies that no subscriber updates have been accepted with respect to the subscriber. The Session-Done command is transmitted by a UIN 202 during task 616, discussed above.

Procedure 1802 performs a task 1802 to unlock the identified subscriber's record 300 by altering data item 314 therein. This unlocking permits future use of record 300. After task 1802, program control exits procedure 1800.

FIG. 19 shows a flow chart of a Page command procedure 1900. Procedure 1900 is performed by a home SIM 206 when it receives a Page command from any UIN 202 within environment 100. The Page command identifies the subscriber to whom the command applies, identifies a sequence number associated with the page, and optionally carries a message. The Page command is transmitted by a UIN 202 as a result of task 1112, discussed above. Procedure 1900 performs a task 1902 to save any message associated with the page at an appropriate location in home database 212 and set link 320 of subscriber record 300 to identify an activity table 500 which is used for storing the page data. In addition, the status of the page may be updated in table 500 to reflect the receipt of the page at the home SIM 206. After task 1902, program control exits procedure 1900.

FIG. 20 shows a flow chart of an Inquiry command procedure 2000. Procedure 2000 is performed by a home SIM 206 when it receives an Inquiry command from any UIN 202 within environment 100. The Inquiry command identifies the subscriber to whom the command applies, the UIN 202 to whom a response is to be sent, and a sequence number which identifies a single page. The Inquiry command is transmitted by a UIN 202 as a result of task 1012, discussed above. Procedure 2000 performs a task 2002 to look up the indicated page in subscriber activity table 500. Next, a task 2004 sends the status or page associated with the sequence number, depending on the type of inquiry command, back to the requesting UIN 202. After task 2004, program control exits procedure 2000.

FIG. 21 shows a flow chart of a Status-Update command procedure 2100. Procedure 2100 is performed by a home SIM 206 when it receives a Status-Update command from any node within environment 100, and particularly from a PTN 110. Status-Update commands carry information which allow home SIM 206 to track progress toward delivering a page. Accordingly, a PTN 110 may send one Status-Update command when it receives a page from a UIN 202, another when it passes the page on to a specified delivery system 102, and yet another when the specified delivery system 102 informs it that it has delivered the page. A Status-Update command includes data identifying the subscriber to whom the command applies, the sequence number of the page to which the update information applies, and data identifying the current status of the page. Procedure 2100 performs a task 2102 to look up the indicated page in subscriber activity table 500. In addition, task 2102 modifies the status data associated with the indicated page in accordance with the data communicated by the Status-Update command. After task 2102, program control exits procedure 2100.

Figure 22:
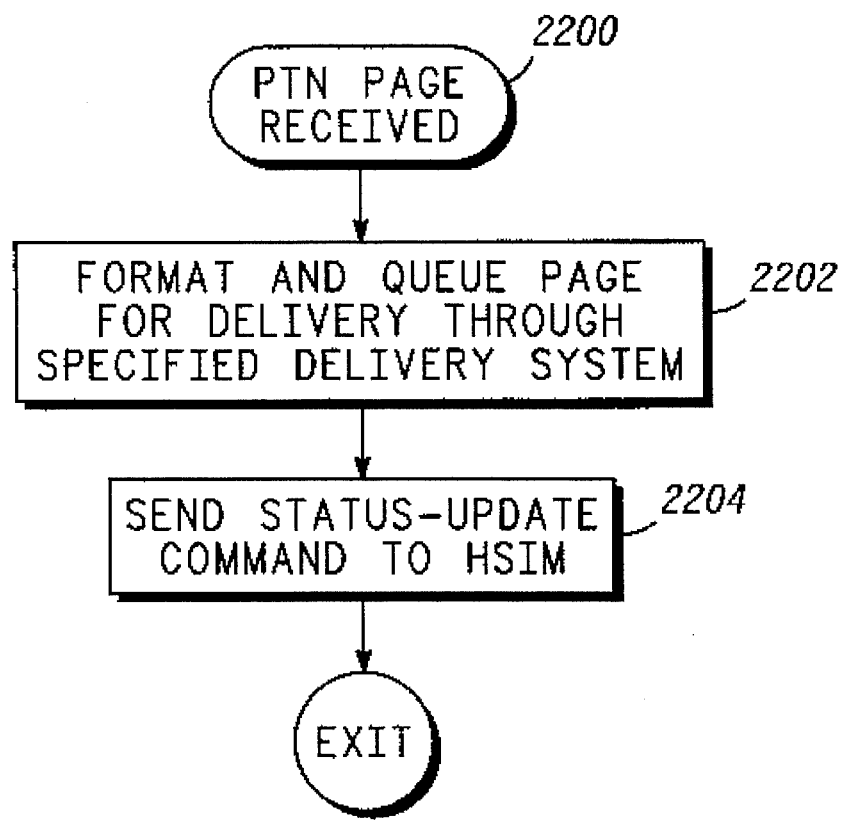

FIG. 22 shows a flow chart of a PTN Page-Received procedure 2200. Procedure 2200 is performed by a PTN 110 when it receives a page from a UIN 202 for delivery through one of its subsystems, if any. Procedure 2200 is performed in response to a command sent by a UIN 202 in accordance with the performance of task 1110, discussed above. A task 2202 formats the page and queues the page for delivery through the delivery system 102 indicated in the page. The page need not be delivered immediately. Rather, PTNs 110 may collect pages for delivery to subordinate delivery systems 102 in an efficient manner. After task 2202, a task 2204 may format and send a Status-Update command to the home SIM 206 for the page. Nothing requires a PTN 110 to immediately send a Status-Update command. In fact, PTN 110 preferably waits until receiving an acknowledgement from a delivery system 102 before de-queuing a page and sending a Status-Update command on to home SIM 206. After task 2204, program control exits procedure 2200.

In summary, the present invention provides an improved method of delivering pages. The present invention provides for multiple page-delivery options. Accordingly, a single system is not required to have the capacity to cover an extremely large region. Moreover, a single page may be delivered through systems which have different delivery characteristics, such as RF communication channels or computer networks. In addition, the present invention provides a distributed system with processing power concentrated in outlying UINs. By distributing the processing, the overall network does not fail when any individual component fails, equipment costs are distributed equally over the network, network resources are conserved, and overall speed in accepting and delivering pages is increased. Furthermore, telecommunication costs are reduced when compared with a centralized system because communications are carried on with the closest nodes.

The present invention has been described above with reference to preferred embodiments. However, those skilled in the art will recognize that changes and modifications may be made in these preferred embodiments without departing from the scope of the present invention. For example, those skilled in the art will appreciate the flexibility of the present invention. Commands discussed above as being directed from a first node, such as a UIN, to a second node, such as a controlling SIM, and then to a third node, such as a home SIM may be sent in a broadcast mode from the first node or may be sent in successive communications from the first node. Moreover, the data elements discussed above must be considered a minimum set of data elements. Those skilled in the art will appreciate that additional data may be useful to various particular implementations of the present invention. For example, date and time stamps are often recorded with various data items in similar systems. These and other changes and modifications which are obvious to those skilled in the art are intended to be included within the scope of the present invention.

What is claimed is:

1. A user interface node adapted for operating in accordance with a distributed, multi-outlet paging system, said user interface node comprising:

a user interface for receiving from a caller, an initiation communication having an identification (ID) value and a termination address, said ID value that identifies one paging distribution network of a plurality of independent paging distribution networks, said termination address including a subscriber ID identifying at least one of a plurality of subscribers to whom a page is to be sent;

a communications network interface for communicating with a communication network; and a processor coupled to said communication network interface, said processor adapted for requesting, through said communication network, a subscriber profile from a subscriber information manager node of said one paging distribution network, said subscriber profile specifying a list of activated independent paging delivery systems to deliver a page, said user interface adapted for collecting a page message from said caller, said communications network interface adapted receiving from said subscriber information manager node, said subscriber profile, said processor adapted for identifying a page termination node associated with said activated independent paging delivery systems, and said communications network interface adapted for sending, through said communication network, said page including said page message to said page termination node, said page termination node formatting said page message for delivery through each of said activated independent paging delivery systems, and sending said formatted page to each of said activated independent paging delivery systems for potential receipt by said subscriber.

2. A user interface node as claimed in claim 1 wherein said activated independent paging delivery systems includes a space-based paging delivery system and a terrestrial based paging delivery system having overlapping geographic coverage regions, and wherein the page termination node formats said page message for delivery within said space-based paging delivery system and said terrestrial based paging delivery system.

3. A method of operating a distributed paging system that is adapted for receiving pages from a plurality of user interface nodes and adapted for delivering said pages to a plurality of independent paging delivery systems, said method comprising the steps of:

routing a request for a subscriber profile to a subscriber information manager node, said subscriber information manager node being identified from an ID value received from a subscriber interface node, said subscriber information manager node being associated with one of said independent paging delivery systems identified by said ID value, said subscriber profile including a list of activated independent paging delivery systems, said activated independent paging delivery systems including a space-based and a terrestrial-based paging delivery system that have overlapping geographic regions; and routing a page to a page termination node that formats said page for delivery within each of said activated independent paging delivery systems.

4. A method of operating a user interface node in accordance with a distributed, multi-outlet paging system, said method comprising the steps of:

receiving from a caller at said user interface node, an initiation communication having an identification (ID) value and a termination address, said ID value that identifies one paging distribution network of a plurality of independent paging distribution networks, said termination address corresponding to a subscriber ID identifying a subscriber to whom a page is to be sent;

requesting, through a communication network, a subscriber profile from a subscriber information manager node of said one paging distribution network based on said subscriber ID, said subscriber profile specifying a list of activated independent paging delivery systems to deliver a page, wherein at least one of said activated independent paging delivery systems has been specified by said subscriber in said subscriber profile;

collecting, at said user information node, a page message from said caller;

receiving at said user interface node from said subscriber information manager node, said subscriber profile; and identifying at said user information node, a page termination node that is associated with said activated independent paging delivery systems of Said list;

sending, through said communication network, said page including said page message from said user interface node to said page termination node, wherein said page termination node formats said page for delivery through each of said activated independent paging delivery systems of said list, and sends said formatted page to each of said activated independent paging delivery systems for potential receipt by said subscriber.

5. A method as claimed in claim 4 additionally comprising the steps of:

informing said subscriber information manager node that said page has been sent to said activated independent paging delivery systems;

after the requesting step, collecting a page screening code from said caller;

when said page screening code matches a page screening code in said subscriber profile, performing said step of identifying said page termination node; and when said page screening code does not match said page screening code in said subscriber profile, terminating said initiation communication.

6. A method as claimed in claim 5 wherein each of said activated independent paging delivery systems has a unique delivery system identification within which there are unique delivery addresses, and wherein said subscriber information manager node includes said unique delivery system identification for each of said activated independent paging delivery systems, and wherein said method additionally comprises the steps of:

(a) receiving a communication at said user interface node, from said subscriber requesting a modification of said subscriber profile, said modification changing said at least one of said activated independent paging delivery system to another activated independent paging delivery system and specifying said unique delivery system identification for said another activated independent paging delivery system; and (b) sending, through said communication network from said user interface node, an update command to said subscriber information manager node, said update command instructing said subscriber information manager node to alter said subscriber profile in accordance with said modification.

7. A method as claimed in claim 6 wherein the requesting said subscriber profile step, said subscriber information manager node processes said subscriber ID to determine a home database node of said subscriber when said subscriber information manager node is not said home database node for said subscriber, said home database node being a second subscriber information manager node having a current delivery address for said subscriber stored therein, said current delivery address corresponding to said list of activated delivery systems.

8. A method as claimed in claim 7 wherein the receiving said subscriber profile step comprises the step of receiving said subscriber profile that specifies said list of activated independent paging delivery systems wherein said list of activated independent paging delivery systems including a space-based delivery system and a terrestrial delivery system, and wherein the identifying said page termination node step includes the step of identifying a first page termination node for said space-based delivery system and the step of identifying a second page termination node for said terrestrial delivery system, said first page termination node formatting said page for said space-based delivery system, said second page termination node formatting said page for said terrestrial delivery system.

9. A method as claimed in claim 7 wherein receiving said subscriber profile step comprises the step of receiving said subscriber profile that specifies said list of activated independent paging delivery systems wherein said list of activated independent paging delivery systems including a space-based delivery system and a terrestrial delivery system, and wherein the identifying said page termination node step includes the step of identifying a page termination node for said space-based delivery system and said terrestrial delivery system, said page termination node formatting said page for said space-based delivery system and said terrestrial delivery system.

10. A method as claimed in claim 8 wherein the step of collecting said page screening code further comprises the step of terminating said initiation communication when said page screening code does not match a page screening code in said subscriber profile.

11. A method as claimed in claim 10 additionally comprising the steps of:

obtaining a page sequence number from said subscriber profile; and sending a confirmation value to said subscriber information manager node, said confirmation value being responsive to said page sequence number.

12. A method as claimed in claim 11 wherein the step of sending said page further comprises the step of including said page sequence number in said page massage.

13. A method as claimed in claim 12 additionally comprising the steps of:

receiving said ID value through a confirmation channel; and processing said ID value received through said confirmation channel to determine an address of said subscriber information manager node.

14. A method of operating a distributed, multi-outlet paging system that is adapted for receiving pages from a plurality of user interface nodes and delivering said pages to a plurality of independent paging delivery systems, said method comprising the steps of:

obtaining through a communication network, a subscriber profile request from a user interface node, said profile request having an identification (ID) value that identifies one paging distribution network of a plurality of independent paging distribution networks, said subscriber profile request also including a subscriber ID that identifies a subscriber to whom a page is to be sent;

processing said subscriber ID value in a subscriber information manager node of said one paging distribution network to determine and deliver to said user interface node a list of activated independent paging delivery systems;

receiving through said communication network from said user interface node, said page for routing to a page termination node, said page termination node being identified by said user interface node in response to receipt of said list of activated independent paging delivery systems;

routing said page to said page termination node, said page termination node formatting said page for delivery through each of said activated independent paging delivery systems, and sending said formatted page to each of said activated independent paging delivery systems for potential receipt by said subscriber.

15. A method as claimed in claim 14 wherein each independent paging delivery system has a unique delivery system identification within which there are unique delivery addresses, and wherein said subscriber information manager node includes said unique delivery system identification for each independent paging delivery system, and wherein the method additionally comprises the step of sending said unique delivery system identification for each of said activated independent paging delivery systems.

16. A method as claimed in claim 15 wherein said list of activated independent paging delivery systems includes a space-based paging delivery system and a terrestrial based paging delivery system having overlapping coverage regions, and wherein said page termination node formats said page for delivery within said space-based paging delivery system, and formats said page for delivery within said terrestrial based delivery system.

17. A method as claimed in claim 16 wherein said method additionally comprises the steps of:

storing a page sequence value at said subscriber information manager node, said page sequence value corresponding to said page; and routing a status update command from said page termination node to said home database node, said status update command instructing said subscriber information manager node to record a delivered page status in association with said page sequence value.

18. A method as claimed in claim 17 additionally comprising the steps of:

storing said page sequence value in association with each of said activated independent paging delivery systems at said subscriber information manager node;

sending said page sequence value from said subscriber information manager node to said user interface node;

receiving, at said subscriber information manager node, an acceptance command which informs said subscriber information manager node that said page has been accepted for delivery within at least one of said activated independent paging delivery systems by said page termination node; and updating, at said subscriber information manager node, said page sequence value in response to said acceptance command.

19. A multi-outlet paging system adapted for receiving pages from a plurality of user interface nodes and adapted for delivering said pages to a plurality of independent paging delivery systems, said multi-outlet paging system comprising:

a page termination node configured to deliver pages in accordance with addresses, and adapted to format said pages for delivery to activated independent paging delivery systems for potential receipt by a subscriber;

means for obtaining an initiation communication from a user interface node, said initiation communication having an identification (ID) value, said ID value identifying one paging distribution network of a plurality of independent paging distribution networks;

a subscriber information manager node associated with said one paging distribution network, said subscriber information node adapted for storing subscriber profiles, each subscriber profile specifying a list of said activated independent paging delivery systems to deliver a page;

means for sending a command to said subscriber information manager node, said command instructing said subscriber information manager node to return said subscriber profile;

means for sending said subscriber profile to said user interface node, said user interface node identifying said page termination node based on activated independent paging delivery systems of said list; address data;

means for receiving said page from said user interface node; and means for sending said page to said one page termination node wherein said page termination node formats said page for delivery through each of said activated independent paging delivery systems, and sends said formatted page to each of said activated independent paging delivery systems for potential receipt by said subscriber.

20. A system as claimed in claim 19 additionally comprising means for sending a second command to said subscriber information manager node, said second command informing said subscriber information manager node that said page has been accepted for delivery, and said second command including at least a portion of said page therewith.

21. A system as claimed in claim 19 additionally comprising:

means, coupled to said means for receiving, for receiving from said user interface node, a communication requesting a modification of said subscriber profile that includes said activated independent paging delivery systems and said ID value; and means, coupled to said means for receiving, for sending an update command to said subscriber information manager node, said update command instructing said subscriber information manager node to alter said subscriber profile.

22. A system as claimed in claim 21 wherein said list of activated independent paging delivery systems includes a space-based paging delivery system and a terrestrial based paging delivery system, and wherein said page termination node is further adapted for formatting said page for said space based delivery system and said terrestrial based delivery system.

23. A system as claimed in claim 22 wherein:

said system additionally comprises means for obtaining a page sequence number from said subscriber profile; and said system additionally comprises means, coupled to said page sequence number obtaining means, for feeding a confirmation value to said subscriber information manager node, said confirmation value being responsive to said page sequence number.

* * * * *

UNITED STATES PATENT AND TRADEMARK OFFICE
CERTIFICATE OF CORRECTION

PATENT NO. : 5,543,785
DATED : August 6, 1996
INVENTOR(S) : Gregory B. Vatt et al.

It is certified that error appears in the above-identified patent and that said Letters Patent is hereby corrected as shown below:

In column 21, claim 4, line 65, delete "Said" and insert --said--.

In column 24, claim 19, line 50, insert --delivery-- after "with".

In column 25, claim 19, line 6, delete "address data;".

Signed and Sealed this

Ninth Day of September, 1997

Attest:

BRUCE LEHMAN

Attesting Officer

Commissioner of Patents and Trademarks